US008655707B2

(12) United States Patent
Richard

(10) Patent No.: US 8,655,707 B2
(45) Date of Patent: Feb. 18, 2014

(54) SYSTEMS AND METHODS FOR PROPAGATING CHANGES IN A DEMAND PLANNING HIERARCHY

(75) Inventor: Victor Harold Richard, Appleton, WI (US)

(73) Assignee: SAS Institute Inc., Cary, NC (US)

( * ) Notice: Subject to any disclaimer, the term of this patent is extended or adjusted under 35 U.S.C. 154(b) by 319 days.

(21) Appl. No.: 12/869,300

(22) Filed: Aug. 26, 2010

(65) Prior Publication Data

US 2012/0053989 A1    Mar. 1, 2012

(51) Int. Cl.
*G06Q 30/02* (2012.01)
(52) U.S. Cl.
CPC ............................ *G06Q 30/02* (2013.01)
USPC ........................................................ 705/7.31
(58) Field of Classification Search
CPC ....................................................... G06Q 30/02
USPC ........................................................ 705/7.31
See application file for complete search history.

(56) References Cited

U.S. PATENT DOCUMENTS

| | | | |
|---|---|---|---|
| 6,816,839 | B1 | 11/2004 | Gung et al. |
| 7,640,180 | B1 * | 12/2009 | Slocum et al. ............... 705/7.25 |
| 7,660,730 | B2 | 2/2010 | Hosoda et al. |
| 7,668,761 | B2 | 2/2010 | Jenkins et al. |
| 7,966,214 | B2 * | 6/2011 | Denton et al. ............... 705/7.12 |
| 8,275,677 | B2 * | 9/2012 | Armstrong et al. ............. 705/29 |
| 2004/0267394 | A1 * | 12/2004 | Kempf et al. ................... 700/99 |
| 2007/0050235 | A1 * | 3/2007 | Ouimet ........................... 705/10 |
| 2007/0100881 | A1 | 5/2007 | McDonald et al. |
| 2007/0208609 | A1 | 9/2007 | Anker et al. |
| 2008/0120129 | A1 * | 5/2008 | Seubert et al. ..................... 705/1 |
| 2010/0088153 | A1 | 4/2010 | Faure et al. |
| 2010/0106555 | A1 * | 4/2010 | Mneimneh et al. ............. 705/10 |
| 2010/0121678 | A1 * | 5/2010 | McCormick ..................... 705/10 |
| 2011/0022434 | A1 * | 1/2011 | Sun et al. .......................... 705/7 |

OTHER PUBLICATIONS

Roel Leus and Willy Herroelen, Stability and Resource Allocation in Project Planning, Operations Management Group, Department of Applied Economics, Katholieke Universiteit Leuven, B-3000 Leuven, Belgium, 1-32, 2002, https://lirias.kuleuven.be/bitstream/123456789/202145/2/OR_0256.pdf.*
SAS Institute Inc. White Paper entitled "Demand Shaping: Achieving and maintaining optimal supply-and-demand alignment", pp. 1-11 (2010).

* cited by examiner

*Primary Examiner* — Romain Jeanty
*Assistant Examiner* — Kurtis Gills
(74) *Attorney, Agent, or Firm* — Kilpatrick Townsend & Stockton LLP

(57) ABSTRACT

Computer-implemented systems and methods are provided for delivering products according to propagated changes in a demand planning hierarchy. Demand planning data is received in addition to a change to the product quantity or a disaggregation factor at a node of the hierarchy. The product quantity is updated at other nodes based upon the received change. Updating the product quantity at other nodes includes solving a set of simultaneous equations to generate an updated demand planning hierarchy. The simultaneous equations include a sum of the product quantity at a node and a augmenting flow at the node equals a sum of the product quantities of children nodes of the nodes and a relieving flow at the node, and disaggregation factors at the node and other nodes are implemented. Solving the set of simultaneous equations includes minimizing the sum of the augmenting flows of the node and other nodes.

24 Claims, 26 Drawing Sheets

1302

Planning Level 2 (Product/Package) data

| product | package | x | nid | prd | suc | sib | df |
|---|---|---|---|---|---|---|---|
| Brand A | bottle | 000 | L2-001 | L1-001 | L3-001 | L2-002 | 0.50 |
| Brand A | can | 000 | L2-002 | L1-001 | L3-004 | L2-xxx | 0.50 |
| Brand B | bottle | 000 | L2-003 | L1-002 | L3-007 | L2-004 | 0.50 |
| Brand B | can | 000 | L2-004 | L1-002 | L3-010 | L2-xxx | 0.50 |
| Brand C | bottle | 000 | L2-005 | L1-003 | L3-013 | L2-006 | 0.50 |
| Brand C | can | 000 | L2-006 | L1-003 | L3-016 | L2-xxx | 0.50 |
| Brand D | bottle | 000 | L2-007 | L1-004 | L3-019 | L2-008 | 0.50 |
| Brand D | can | 000 | L2-008 | L1-004 | L3-022 | L2-xxx | 0.50 |

1304

Planning Level 3 (Product/Package/Distributor) data

| product | package | dist | x | nid | prd | suc | sib | df |
|---|---|---|---|---|---|---|---|---|
| Brand A | bottle | D001 | 000 | L3-001 | L2-001 | L4-001 | L3-002 | 0.45 |
| Brand A | bottle | D002 | 000 | L3-002 | L2-001 | L4-010 | L3-003 | 0.25 |
| Brand A | bottle | D003 | 000 | L3-003 | L2-001 | L4-019 | L3-xxx | 0.30 |
| Brand A | can | D001 | 000 | L3-004 | L2-002 | L4-028 | L3-005 | 0.45 |
| Brand A | can | D002 | 000 | L3-005 | L2-002 | L4-037 | L3-006 | 0.25 |
| Brand A | can | D003 | 000 | L3-006 | L2-002 | L4-046 | L3-xxx | 0.30 |
| Brand B | bottle | D001 | 000 | L3-007 | L2-003 | L4-055 | L3-008 | 0.45 |
| Brand B | bottle | D002 | 000 | L3-008 | L2-003 | L4-064 | L3-009 | 0.25 |
| Brand B | bottle | D003 | 000 | L3-009 | L2-003 | L4-073 | L3-xxx | 0.30 |
| Brand B | can | D001 | 000 | L3-010 | L2-004 | L4-082 | L3-011 | 0.45 |
| Brand B | can | D002 | 000 | L3-011 | L2-004 | L4-091 | L3-012 | 0.25 |
| Brand B | can | D003 | 000 | L3-012 | L2-004 | L4-100 | L3-xxx | 0.30 |
| Brand C | bottle | D001 | 000 | L3-013 | L2-005 | L4-109 | L3-014 | 0.45 |
| Brand C | bottle | D002 | 000 | L3-014 | L2-005 | L4-118 | L3-015 | 0.25 |
| Brand C | bottle | D003 | 000 | L3-015 | L2-005 | L4-127 | L3-xxx | 0.30 |
| Brand C | can | D001 | 000 | L3-016 | L2-006 | L4-136 | L3-017 | 0.45 |
| Brand C | can | D002 | 000 | L3-017 | L2-006 | L4-145 | L3-018 | 0.25 |
| Brand C | can | D003 | 000 | L3-018 | L2-006 | L4-154 | L3-xxx | 0.30 |
| Brand D | bottle | D001 | 000 | L3-019 | L2-007 | L4-163 | L3-020 | 0.45 |
| Brand D | bottle | D002 | 000 | L3-020 | L2-007 | L4-172 | L3-021 | 0.25 |
| Brand D | bottle | D003 | 000 | L3-021 | L2-007 | L4-181 | L3-xxx | 0.30 |
| Brand D | can | D001 | 000 | L3-022 | L2-008 | L4-190 | L3-023 | 0.45 |
| Brand D | can | D002 | 000 | L3-023 | L2-008 | L4-199 | L3-024 | 0.25 |
| Brand D | can | D003 | 000 | L3-024 | L2-008 | L4-208 | L3-xxx | 0.30 |

*Fig. 13*

Partitioning Constraints:

Constraint L2B['L2-001']: — X0['L2-001'] + XI['L2-001'] — XX['L3-001'] — XX['L3-002'] — XX['L3-003'] + XX['L2-001'] = 0

Constraint L2B['L2-002']: — X0['L2-002'] + XI['L2-002'] — XX['L3-004'] — XX['L3-005'] — XX['L3-006'] + XX['L2-002'] = 0

Constraint L2B['L2-003']: — X0['L2-003'] + XI['L2-003'] — XX['L3-007'] — XX['L3-008'] — XX['L3-009'] + XX['L2-003'] = 0

Constraint L2B['L2-004']: — X0['L2-004'] + XI['L2-004'] — XX['L3-010'] — XX['L3-011'] — XX['L3-012'] + XX['L2-004'] = 0

Constraint L2B['L2-005']: — X0['L2-005'] + XI['L2-005'] — XX['L3-013'] — XX['L3-014'] — XX['L3-015'] + XX['L2-005'] = 0

Constraint L2B['L2-006']: — X0['L2-006'] + XI['L2-006'] — XX['L3-016'] — XX['L3-017'] — XX['L3-018'] + XX['L2-006'] = 0

Constraint L2B['L2-007']: — X0['L2-007'] + XI['L2-007'] — XX['L3-019'] — XX['L3-020'] — XX['L3-021'] + XX['L2-007'] = 0

Constraint L2B['L2-008']: — X0['L2-008'] + XI['L2-008'] — XX['L3-022'] — XX['L3-023'] — XX['L3-024'] + XX['L2-008'] = 0

*Fig. 14*

Disaggregation Constraints:

1502

Constraint D2C['L2-001']: 0.5*X0C['L1-001'] - 0.5*X1C['L1-001'] - 0.5*XXC['L1-001'] + XXC['L2-001'] = 0

Constraint D2C['L2-002']: 0.5*X0C['L1-001'] - 0.5*X1C['L1-001'] - 0.5*XXC['L1-001'] + XXC['L2-002'] = 0

Constraint D2C['L2-003']: 0.5*X0C['L1-002'] - 0.5*X1C['L1-002'] - 0.5*XXC['L1-002'] + XXC['L2-003'] = 0

Constraint D2C['L2-004']: 0.5*X0C['L1-002'] - 0.5*X1C['L1-002'] - 0.5*XXC['L1-002'] + XXC['L2-004'] = 0

Constraint D2C['L2-005']: 0.5*X0C['L1-003'] - 0.5*X1C['L1-003'] - 0.5*XXC['L1-003'] + XXC['L2-005'] = 0

*Fig. 15*

```
Minimize obj = X0['L4-001'] + XI['L4-001'] + X0['L4-002'] + XI['L4-002'] + X0['L4-003'] +
XI['L4-003'] + X0['L4-004'] + XI['L4-004'] + X0['L4-005'] + XI['L4-005'] + X0['L4-006'] +
XI['L4-006'] + X0['L4-007'] + XI['L4-007'] + X0['L4-008'] + XI['L4-008'] + X0['L4-009'] +
XI['L4-009'] + X0['L4-010'] + XI['L4-010'] + X0['L4-011'] + XI['L4-011'] + X0['L4-012'] +
XI['L4-012'] + X0['L4-013'] + XI['L4-013'] + X0['L4-014'] + XI['L4-014'] + X0['L4-015'] +
XI['L4-015'] + X0['L4-016'] + XI['L4-016'] + X0['L4-017'] + XI['L4-017'] + X0['L4-018'] +
XI['L4-018'] + X0['L4-019'] + XI['L4-019'] + X0['L4-020'] + XI['L4-020'] + X0['L4-021'] +
XI['L4-021'] + X0['L4-022'] + XI['L4-022'] + X0['L4-023'] + XI['L4-023'] + X0['L4-024'] +
XI['L4-024'] + X0['L4-025'] + XI['L4-025'] + X0['L4-026'] + XI['L4-026'] + X0['L4-027'] +
XI['L4-027'] + X0['L4-028'] + XI['L4-028'] + X0['L4-029'] + XI['L4-029'] + X0['L4-030'] +
XI['L4-030'] + X0['L4-031'] + XI['L4-031'] + X0['L4-032'] + XI['L4-032'] + X0['L4-033'] +
XI['L4-033'] + X0['L4-034'] + XI['L4-034'] + X0['L4-035'] + XI['L4-035'] + X0['L4-036'] +
XI['L4-036'] + X0['L4-037'] + XI['L4-037'] + X0['L4-038'] + XI['L4-038'] + X0['L4-039'] +
XI['L4-039'] + X0['L4-040'] + XI['L4-040'] + X0['L4-041'] + XI['L4-041'] + X0['L4-042'] +
XI['L4-042'] + X0['L4-043'] + XI['L4-043'] + X0['L4-044'] + XI['L4-044'] + X0['L4-045'] +
XI['L4-045'] + X0['L4-046'] + XI['L4-046'] + X0['L4-047'] + XI['L4-047'] + X0['L4-048'] +
XI['L4-048'] + X0['L4-049'] + XI['L4-049'] + X0['L4-050'] + XI['L4-050'] + X0['L4-051'] +
XI['L4-051'] + X0['L4-052'] + XI['L4-052'] + X0['L4-053'] + XI['L4-053'] + X0['L4-054'] +
XI['L4-054'] + X0['L4-055'] + XI['L4-055'] + X0['L4-056'] + XI['L4-056'] + X0['L4-057'] +
XI['L4-057'] + X0['L4-058'] + XI['L4-058'] + X0['L4-059'] + XI['L4-059'] + X0['L4-060'] +
XI['L4-060'] + X0['L4-061'] + XI['L4-061'] + X0['L4-062'] + XI['L4-062'] + X0['L4-063'] +
XI['L4-063'] + X0['L4-064'] + XI['L4-064'] + X0['L4-065'] + XI['L4-065'] + X0['L4-066'] +
XI['L4-066'] + X0['L4-067'] + XI['L4-067'] + X0['L4-068'] + XI['L4-068'] + X0['L4-069'] +
XI['L4-069'] + X0['L4-070'] + XI['L4-070'] + X0['L4-071'] + XI['L4-071'] + X0['L4-072'] +
XI['L4-072'] + X0['L4-073'] + XI['L4-073'] + X0['L4-074'] + XI['L4-074'] + X0['L4-075'] +
XI['L4-075'] + X0['L4-076'] + XI['L4-076'] + X0['L4-077'] + XI['L4-077'] + X0['L4-078'] +
XI['L4-078'] + X0['L4-079'] + XI['L4-079'] + X0['L4-080'] + XI['L4-080'] + X0['L4-081'] +
XI['L4-081'] + X0['L4-082'] + XI['L4-082'] + X0['L4-083'] + XI['L4-083'] + X0['L4-084'] +
XI['L4-084'] + X0['L4-085'] + XI['L4-085'] + X0['L4-086'] + XI['L4-086'] + X0['L4-087'] +
XI['L4-087'] + X0['L4-088'] + XI['L4-088'] + X0['L4-089'] + XI['L4-089'] + X0['L4-090'] +
XI['L4-090'] + X0['L4-091'] + XI['L4-091'] + X0['L4-092'] + XI['L4-092'] + X0['L4-093'] +
XI['L4-093'] + X0['L4-094'] + XI['L4-094'] + X0['L4-095'] + XI['L4-095'] + X0['L4-096'] +
XI['L4-096'] + X0['L4-097'] + XI['L4-097'] + X0['L4-098'] + XI['L4-098'] + X0['L4-099'] +
XI['L4-099'] + X0['L4-100'] + XI['L4-100'] + X0['L4-101'] + XI['L4-101'] + X0['L4-102'] +
XI['L4-102'] + X0['L4-103'] + XI['L4-103'] + X0['L4-104'] + XI['L4-104'] + X0['L4-105'] +
XI['L4-105'] + X0['L4-106'] + XI['L4-106'] + X0['L4-107'] + XI['L4-107'] + X0['L4-108'] +
XI['L4-108'] + X0['L4-109'] + XI['L4-109'] + X0['L4-110'] + XI['L4-110'] + X0['L4-111'] +
XI['L4-111'] + X0['L4-112'] + XI['L4-112'] + X0['L4-113'] + XI['L4-113'] + X0['L4-114'] +
XI['L4-114'] + X0['L4-115'] + XI['L4-115'] + X0['L4-116'] + XI['L4-116'] + X0['L4-117'] +
XI['L4-117'] + X0['L4-118'] + XI['L4-118'] + X0['L4-119'] + XI['L4-119'] + X0['L4-120'] +
XI['L4-120'] + X0['L4-121'] + XI['L4-121'] + X0['L4-122'] + XI['L4-122'] + X0['L4-123'] +
```

| [1] | XX | XI | XO | XS | [1] | XX | XI | XO | XS |
|---|---|---|---|---|---|---|---|---|---|
| L0-001 | 120000.0 | 0 | 0 | | L3-021 | 4500.0 | 0 | 0 | |
| L1-001 | 30000.0 | 0 | 0 | | L3-022 | 6750.0 | 0 | 0 | |
| L1-002 | 30000.0 | 0 | 0 | | L3-023 | 3750.0 | 0 | 0 | |
| L1-003 | 30000.0 | 0 | 0 | | L3-024 | 4500.0 | 0 | 0 | |
| L1-004 | 30000.0 | 0 | 0 | | L4-001 | 742.5 | 0 | 0 | 742.5 |
| L2-001 | 15000.0 | 0 | 0 | | L4-002 | 742.5 | 0 | 0 | 742.5 |
| L2-002 | 15000.0 | 0 | 0 | | L4-003 | 742.5 | 0 | 0 | 742.5 |
| L2-003 | 15000.0 | 0 | 0 | | L4-004 | 810.0 | 0 | 0 | 810.0 |
| L2-004 | 15000.0 | 0 | 0 | | L4-005 | 742.5 | 0 | 0 | 742.5 |
| L2-005 | 15000.0 | 0 | 0 | | L4-006 | 742.5 | 0 | 0 | 742.5 |
| L2-006 | 15000.0 | 0 | 0 | | L4-007 | 742.5 | 0 | 0 | 742.5 |
| L2-007 | 15000.0 | 0 | 0 | | L4-008 | 742.5 | 0 | 0 | 742.5 |
| L2-008 | 15000.0 | 0 | 0 | | L4-009 | 742.5 | 0 | 0 | 742.5 |
| L3-001 | 6750.0 | 0 | 0 | | L4-010 | 412.5 | 0 | 0 | 412.5 |
| L3-002 | 3750.0 | 0 | 0 | | L4-011 | 412.5 | 0 | 0 | 412.5 |
| L3-003 | 4500.0 | 0 | 0 | | L4-012 | 412.5 | 0 | 0 | 412.5 |
| L3-004 | 6750.0 | 0 | 0 | | L4-013 | 450.0 | 0 | 0 | 450.0 |
| L3-005 | 3750.0 | 0 | 0 | | L4-014 | 412.5 | 0 | 0 | 412.5 |
| L3-006 | 4500.0 | 0 | 0 | | L4-015 | 412.5 | 0 | 0 | 412.5 |
| L3-007 | 6750.0 | 0 | 0 | | L4-016 | 412.5 | 0 | 0 | 412.5 |
| L3-008 | 3750.0 | 0 | 0 | | L4-017 | 412.5 | 0 | 0 | 412.5 |
| L3-009 | 4500.0 | 0 | 0 | | L4-018 | 412.5 | 0 | 0 | 412.5 |
| L3-010 | 6750.0 | 0 | 0 | | L4-019 | 495.0 | 0 | 0 | 495.0 |
| L3-011 | 3750.0 | 0 | 0 | | L4-020 | 495.0 | 0 | 0 | 495.0 |
| L3-012 | 4500.0 | 0 | 0 | | L4-021 | 495.0 | 0 | 0 | 495.0 |
| L3-013 | 6750.0 | 0 | 0 | | L4-022 | 540.0 | 0 | 0 | 540.0 |
| L3-014 | 3750.0 | 0 | 0 | | L4-023 | 495.0 | 0 | 0 | 495.0 |
| L3-015 | 4500.0 | 0 | 0 | | L4-024 | 495.0 | 0 | 0 | 495.0 |
| L3-016 | 6750.0 | 0 | 0 | | L4-025 | 495.0 | 0 | 0 | 495.0 |
| L3-017 | 3750.0 | 0 | 0 | | L4-026 | 495.0 | 0 | 0 | 495.0 |
| L3-018 | 4500.0 | 0 | 0 | | L4-027 | 495.0 | 0 | 0 | 495.0 |
| L3-019 | 6750.0 | 0 | 0 | | L4-028 | 742.5 | 0 | 0 | 742.5 |
| L3-020 | 3750.0 | 0 | 0 | | L4-029 | 742.5 | 0 | 0 | 742.5 |
| | | | | | L4-030 | 742.5 | 0 | 0 | 742.5 |
| | | | | | L4-031 | 810.0 | 0 | 0 | 810.0 |
| | | | | | L4-032 | 742.5 | 0 | 0 | 742.5 |
| | | | | | L4-033 | 742.5 | 0 | 0 | 742.5 |
| | | | | | L4-034 | 742.5 | 0 | 0 | 742.5 |
| | | | | | L4-035 | 742.5 | 0 | 0 | 742.5 |
| | | | | | L4-036 | 742.5 | 0 | 0 | 742.5 |
| | | | | | L4-037 | 412.5 | 0 | 0 | 412.5 |
| | | | | | L4-038 | 412.5 | 0 | 0 | 412.5 |
| | | | | | L4-039 | 412.5 | 0 | 0 | 412.5 |
| | | | | | L4-040 | 450.0 | 0 | 0 | 450.0 |
| | | | | | L4-041 | 412.5 | 0 | 0 | 412.5 |
| | | | | | L4-042 | 412.5 | 0 | 0 | 412.5 |

Fig. 17A

| [1] | XX | XI | XO | XS | [1] | XX | XI | XO | XS |
|---|---|---|---|---|---|---|---|---|---|
| L4-043 | 412.5 | 0 | 0 | 412.5 | L4-089 | 742.5 | 0 | 0 | 742.5 |
| L4-044 | 412.5 | 0 | 0 | 412.5 | L4-090 | 742.5 | 0 | 0 | 742.5 |
| L4-045 | 412.5 | 0 | 0 | 412.5 | L4-091 | 412.5 | 0 | 0 | 412.5 |
| L4-046 | 495.0 | 0 | 0 | 495.0 | L4-092 | 412.5 | 0 | 0 | 412.5 |
| L4-047 | 495.0 | 0 | 0 | 495.0 | L4-093 | 412.5 | 0 | 0 | 412.5 |
| L4-048 | 495.0 | 0 | 0 | 495.0 | L4-094 | 450.0 | 0 | 0 | 450.0 |
| L4-049 | 540.0 | 0 | 0 | 540.0 | L4-095 | 412.5 | 0 | 0 | 412.5 |
| L4-050 | 495.0 | 0 | 0 | 495.0 | L4-096 | 412.5 | 0 | 0 | 412.5 |
| L4-051 | 495.0 | 0 | 0 | 495.0 | L4-097 | 412.5 | 0 | 0 | 412.5 |
| L4-052 | 495.0 | 0 | 0 | 495.0 | L4-098 | 412.5 | 0 | 0 | 412.5 |
| L4-053 | 495.0 | 0 | 0 | 495.0 | L4-099 | 412.5 | 0 | 0 | 412.5 |
| L4-054 | 495.0 | 0 | 0 | 495.0 | L4-100 | 495.0 | 0 | 0 | 495.0 |
| L4-055 | 742.5 | 0 | 0 | 742.5 | L4-101 | 495.0 | 0 | 0 | 495.0 |
| L4-056 | 742.5 | 0 | 0 | 742.5 | L4-102 | 495.0 | 0 | 0 | 495.0 |
| L4-057 | 742.5 | 0 | 0 | 742.5 | L4-103 | 540.0 | 0 | 0 | 540.0 |
| L4-058 | 810.0 | 0 | 0 | 810.0 | L4-104 | 495.0 | 0 | 0 | 495.0 |
| L4-059 | 742.5 | 0 | 0 | 742.5 | L4-105 | 495.0 | 0 | 0 | 495.0 |
| L4-060 | 742.5 | 0 | 0 | 742.5 | L4-106 | 495.0 | 0 | 0 | 495.0 |
| L4-061 | 742.5 | 0 | 0 | 742.5 | L4-107 | 495.0 | 0 | 0 | 495.0 |
| L4-062 | 742.5 | 0 | 0 | 742.5 | L4-108 | 495.0 | 0 | 0 | 495.0 |
| L4-063 | 742.5 | 0 | 0 | 742.5 | L4-109 | 742.5 | 0 | 0 | 742.5 |
| L4-064 | 412.5 | 0 | 0 | 412.5 | L4-110 | 742.5 | 0 | 0 | 742.5 |
| L4-065 | 412.5 | 0 | 0 | 412.5 | L4-111 | 742.5 | 0 | 0 | 742.5 |
| L4-066 | 412.5 | 0 | 0 | 412.5 | L4-112 | 810.0 | 0 | 0 | 810.0 |
| L4-067 | 450.0 | 0 | 0 | 450.0 | L4-113 | 742.5 | 0 | 0 | 742.5 |
| L4-068 | 412.5 | 0 | 0 | 412.5 | L4-114 | 742.5 | 0 | 0 | 742.5 |
| L4-069 | 412.5 | 0 | 0 | 412.5 | L4-115 | 742.5 | 0 | 0 | 742.5 |
| L4-070 | 412.5 | 0 | 0 | 412.5 | L4-116 | 742.5 | 0 | 0 | 742.5 |
| L4-071 | 412.5 | 0 | 0 | 412.5 | L4-117 | 742.5 | 0 | 0 | 742.5 |
| L4-072 | 412.5 | 0 | 0 | 412.5 | L4-118 | 412.5 | 0 | 0 | 412.5 |
| L4-073 | 495.0 | 0 | 0 | 495.0 | L4-119 | 412.5 | 0 | 0 | 412.5 |
| L4-074 | 495.0 | 0 | 0 | 495.0 | L4-120 | 412.5 | 0 | 0 | 412.5 |
| L4-075 | 495.0 | 0 | 0 | 495.0 | L4-121 | 450.0 | 0 | 0 | 450.0 |
| L4-076 | 540.0 | 0 | 0 | 540.0 | L4-122 | 412.5 | 0 | 0 | 412.5 |
| L4-077 | 495.0 | 0 | 0 | 495.0 | L4-123 | 412.5 | 0 | 0 | 412.5 |
| L4-078 | 495.0 | 0 | 0 | 495.0 | L4-124 | 412.5 | 0 | 0 | 412.5 |
| L4-079 | 495.0 | 0 | 0 | 495.0 | L4-125 | 412.5 | 0 | 0 | 412.5 |
| L4-080 | 495.0 | 0 | 0 | 495.0 | L4-126 | 412.5 | 0 | 0 | 412.5 |
| L4-081 | 495.0 | 0 | 0 | 495.0 | L4-127 | 495.0 | 0 | 0 | 495.0 |
| L4-082 | 742.5 | 0 | 0 | 742.5 | L4-128 | 495.0 | 0 | 0 | 495.0 |
| L4-083 | 742.5 | 0 | 0 | 742.5 | L4-129 | 495.0 | 0 | 0 | 495.0 |
| L4-084 | 742.5 | 0 | 0 | 742.5 | L4-130 | 540.0 | 0 | 0 | 540.0 |
| L4-085 | 810.0 | 0 | 0 | 810.0 | L4-131 | 495.0 | 0 | 0 | 495.0 |
| L4-086 | 742.5 | 0 | 0 | 742.5 | L4-132 | 495.0 | 0 | 0 | 495.0 |
| L4-087 | 742.5 | 0 | 0 | 742.5 | L4-133 | 495.0 | 0 | 0 | 495.0 |
| L4-088 | 742.5 | 0 | 0 | 742.5 | L4-134 | 495.0 | 0 | 0 | 495.0 |

Fig. 17B

| [ ] | XX | XI | XO | XS | [ ] | XX | XI | XO | XS |
|---|---|---|---|---|---|---|---|---|---|
| L4-135 | 495.0 | 0 | 0 | 495.0 | L4-181 | 495.0 | 0 | 0 | 495.0 |
| L4-136 | 742.5 | 0 | 0 | 742.5 | L4-182 | 495.0 | 0 | 0 | 495.0 |
| L4-137 | 742.5 | 0 | 0 | 742.5 | L4-183 | 495.0 | 0 | 0 | 495.0 |
| L4-138 | 742.5 | 0 | 0 | 742.5 | L4-184 | 540.0 | 0 | 0 | 540.0 |
| L4-139 | 810.0 | 0 | 0 | 810.0 | L4-185 | 495.0 | 0 | 0 | 495.0 |
| L4-140 | 742.5 | 0 | 0 | 742.5 | L4-186 | 495.0 | 0 | 0 | 495.0 |
| L4-141 | 742.5 | 0 | 0 | 742.5 | L4-187 | 495.0 | 0 | 0 | 495.0 |
| L4-142 | 742.5 | 0 | 0 | 742.5 | L4-188 | 495.0 | 0 | 0 | 495.0 |
| L4-143 | 742.5 | 0 | 0 | 742.5 | L4-189 | 495.0 | 0 | 0 | 495.0 |
| L4-144 | 742.5 | 0 | 0 | 742.5 | L4-190 | 742.5 | 0 | 0 | 742.5 |
| L4-145 | 412.5 | 0 | 0 | 412.5 | L4-191 | 742.5 | 0 | 0 | 742.5 |
| L4-146 | 412.5 | 0 | 0 | 412.5 | L4-192 | 742.5 | 0 | 0 | 742.5 |
| L4-147 | 412.5 | 0 | 0 | 412.5 | L4-193 | 810.0 | 0 | 0 | 810.0 |
| L4-148 | 450.0 | 0 | 0 | 450.0 | L4-194 | 742.5 | 0 | 0 | 742.5 |
| L4-149 | 412.5 | 0 | 0 | 412.5 | L4-195 | 742.5 | 0 | 0 | 742.5 |
| L4-150 | 412.5 | 0 | 0 | 412.5 | L4-196 | 742.5 | 0 | 0 | 742.5 |
| L4-151 | 412.5 | 0 | 0 | 412.5 | L4-197 | 742.5 | 0 | 0 | 742.5 |
| L4-152 | 412.5 | 0 | 0 | 412.5 | L4-198 | 742.5 | 0 | 0 | 742.5 |
| L4-153 | 412.5 | 0 | 0 | 412.5 | L4-199 | 412.5 | 0 | 0 | 412.5 |
| L4-154 | 495.0 | 0 | 0 | 495.0 | L4-200 | 412.5 | 0 | 0 | 412.5 |
| L4-155 | 495.0 | 0 | 0 | 495.0 | L4-201 | 412.5 | 0 | 0 | 412.5 |
| L4-156 | 495.0 | 0 | 0 | 495.0 | L4-202 | 450.0 | 0 | 0 | 450.0 |
| L4-157 | 540.0 | 0 | 0 | 540.0 | L4-203 | 412.5 | 0 | 0 | 412.5 |
| L4-158 | 495.0 | 0 | 0 | 495.0 | L4-204 | 412.5 | 0 | 0 | 412.5 |
| L4-159 | 495.0 | 0 | 0 | 495.0 | L4-205 | 412.5 | 0 | 0 | 412.5 |
| L4-160 | 495.0 | 0 | 0 | 495.0 | L4-206 | 412.5 | 0 | 0 | 412.5 |
| L4-161 | 495.0 | 0 | 0 | 495.0 | L4-207 | 412.5 | 0 | 0 | 412.5 |
| L4-162 | 495.0 | 0 | 0 | 495.0 | L4-208 | 495.0 | 0 | 0 | 495.0 |
| L4-163 | 742.5 | 0 | 0 | 742.5 | L4-209 | 495.0 | 0 | 0 | 495.0 |
| L4-164 | 742.5 | 0 | 0 | 742.5 | L4-210 | 495.0 | 0 | 0 | 495.0 |
| L4-165 | 742.5 | 0 | 0 | 742.5 | L4-211 | 540.0 | 0 | 0 | 540.0 |
| L4-166 | 810.0 | 0 | 0 | 810.0 | L4-212 | 495.0 | 0 | 0 | 495.0 |
| L4-167 | 742.5 | 0 | 0 | 742.5 | L4-213 | 495.0 | 0 | 0 | 495.0 |
| L4-168 | 742.5 | 0 | 0 | 742.5 | L4-214 | 495.0 | 0 | 0 | 495.0 |
| L4-169 | 742.5 | 0 | 0 | 742.5 | L4-215 | 495.0 | 0 | 0 | 495.0 |
| L4-170 | 742.5 | 0 | 0 | 742.5 | L4-216 | 495.0 | 0 | 0 | 495.0 |
| L4-171 | 742.5 | 0 | 0 | 742.5 | | | | | |
| L4-172 | 412.5 | 0 | 0 | 412.5 | | | | | |
| L4-173 | 412.5 | 0 | 0 | 412.5 | | | | | |
| L4-174 | 412.5 | 0 | 0 | 412.5 | | | | | |
| L4-175 | 450.0 | 0 | 0 | 450.0 | | | | | |
| L4-176 | 412.5 | 0 | 0 | 412.5 | | | | | |
| L4-177 | 412.5 | 0 | 0 | 412.5 | | | | | |
| L4-178 | 412.5 | 0 | 0 | 412.5 | | | | | |
| L4-179 | 412.5 | 0 | 0 | 412.5 | | | | | |
| L4-180 | 412.5 | 0 | 0 | 412.5 | | | | | |

Fig. 17C

| [1] | XX | XI | XO | XS | [1] | XX | XI | XO | XS |
|---|---|---|---|---|---|---|---|---|---|
| L0-001 | 110000.0 | 0 | 0 | | L3-021 | 3000.0 | 0 | 0 | |
| L1-001 | 30000.0 | 0 | 0 | | L3-022 | 4500.0 | 0 | 0 | |
| L1-002 | 40000.0 | 0 | 0 | | L3-023 | 2500.0 | 0 | 0 | |
| L1-003 | 20000.0 | 0 | 0 | | L3-024 | 3000.0 | 0 | 0 | |
| L1-004 | 20000.0 | 0 | 0 | | L4-001 | 742.5 | 0 | 0 | 742.5 |
| L2-001 | 15000.0 | 0 | 0 | | L4-002 | 742.5 | 0 | 0 | 742.5 |
| L2-002 | 15000.0 | 0 | 0 | | L4-003 | 742.5 | 0 | 0 | 742.5 |
| L2-003 | 20000.0 | 0 | 0 | | L4-004 | 810.0 | 0 | 0 | 810.0 |
| L2-004 | 20000.0 | 0 | 0 | | L4-005 | 742.5 | 0 | 0 | 742.5 |
| L2-005 | 10000.0 | 0 | 0 | | L4-006 | 742.5 | 0 | 0 | 742.5 |
| L2-006 | 10000.0 | 0 | 0 | | L4-007 | 742.5 | 0 | 0 | 742.5 |
| L2-007 | 10000.0 | 0 | 0 | | L4-008 | 742.5 | 0 | 0 | 742.5 |
| L2-008 | 10000.0 | 0 | 0 | | L4-009 | 742.5 | 0 | 0 | 742.5 |
| L3-001 | 6750.0 | 0 | 0 | | L4-010 | 412.5 | 0 | 0 | 412.5 |
| L3-002 | 3750.0 | 0 | 0 | | L4-011 | 412.5 | 0 | 0 | 412.5 |
| L3-003 | 4500.0 | 0 | 0 | | L4-012 | 412.5 | 0 | 0 | 412.5 |
| L3-004 | 6750.0 | 0 | 0 | | L4-013 | 450.0 | 0 | 0 | 450.0 |
| L3-005 | 3750.0 | 0 | 0 | | L4-014 | 412.5 | 0 | 0 | 412.5 |
| L3-006 | 4500.0 | 0 | 0 | | L4-015 | 412.5 | 0 | 0 | 412.5 |
| L3-007 | 9000.0 | 0 | 0 | | L4-016 | 412.5 | 0 | 0 | 412.5 |
| L3-008 | 5000.0 | 0 | 0 | | L4-017 | 412.5 | 0 | 0 | 412.5 |
| L3-009 | 6000.0 | 0 | 0 | | L4-018 | 412.5 | 0 | 0 | 412.5 |
| L3-010 | 9000.0 | 0 | 0 | | L4-019 | 495.0 | 0 | 0 | 495.0 |
| L3-011 | 5000.0 | 0 | 0 | | L4-020 | 495.0 | 0 | 0 | 495.0 |
| L3-012 | 6000.0 | 0 | 0 | | L4-021 | 495.0 | 0 | 0 | 495.0 |
| L3-013 | 4500.0 | 0 | 0 | | L4-022 | 540.0 | 0 | 0 | 540.0 |
| L3-014 | 2500.0 | 0 | 0 | | L4-023 | 495.0 | 0 | 0 | 495.0 |
| L3-015 | 3000.0 | 0 | 0 | | L4-024 | 495.0 | 0 | 0 | 495.0 |
| L3-016 | 4500.0 | 0 | 0 | | L4-025 | 495.0 | 0 | 0 | 495.0 |
| L3-017 | 2500.0 | 0 | 0 | | L4-026 | 495.0 | 0 | 0 | 495.0 |
| L3-018 | 3000.0 | 0 | 0 | | L4-027 | 495.0 | 0 | 0 | 495.0 |
| L3-019 | 4500.0 | 0 | 0 | | L4-028 | 742.5 | 0 | 0 | 742.5 |
| L3-020 | 2500.0 | 0 | 0 | | L4-029 | 742.5 | 0 | 0 | 742.5 |
| | | | | | L4-030 | 742.5 | 0 | 0 | 742.5 |
| | | | | | L4-031 | 810.0 | 0 | 0 | 810.0 |
| | | | | | L4-032 | 742.5 | 0 | 0 | 742.5 |
| | | | | | L4-033 | 742.5 | 0 | 0 | 742.5 |
| | | | | | L4-034 | 742.5 | 0 | 0 | 742.5 |
| | | | | | L4-035 | 742.5 | 0 | 0 | 742.5 |
| | | | | | L4-036 | 742.5 | 0 | 0 | 742.5 |
| | | | | | L4-037 | 412.5 | 0 | 0 | 412.5 |
| | | | | | L4-038 | 412.5 | 0 | 0 | 412.5 |
| | | | | | L4-039 | 412.5 | 0 | 0 | 412.5 |
| | | | | | L4-040 | 450.0 | 0 | 0 | 450.0 |
| | | | | | L4-041 | 412.5 | 0 | 0 | 412.5 |
| | | | | | L4-042 | 412.5 | 0 | 0 | 412.5 |

Fig. 18A

| [1] | XX | XI | XO | XS | [1] | XX | XI | XO | XS |
|---|---|---|---|---|---|---|---|---|---|
| L4-043 | 412.5 | 0 | 0 | 412.5 | L4-089 | 990.0 | 0 | 0 | 990.0 |
| L4-044 | 412.5 | 0 | 0 | 412.5 | L4-090 | 990.0 | 0 | 0 | 990.0 |
| L4-045 | 412.5 | 0 | 0 | 412.5 | L4-091 | 550.0 | 0 | 0 | 550.0 |
| L4-046 | 495.0 | 0 | 0 | 495.0 | L4-092 | 550.0 | 0 | 0 | 550.0 |
| L4-047 | 495.0 | 0 | 0 | 495.0 | L4-093 | 550.0 | 0 | 0 | 550.0 |
| L4-048 | 495.0 | 0 | 0 | 495.0 | L4-094 | 600.0 | 0 | 0 | 600.0 |
| L4-049 | 540.0 | 0 | 0 | 540.0 | L4-095 | 550.0 | 0 | 0 | 550.0 |
| L4-050 | 495.0 | 0 | 0 | 495.0 | L4-096 | 550.0 | 0 | 0 | 550.0 |
| L4-051 | 495.0 | 0 | 0 | 495.0 | L4-097 | 550.0 | 0 | 0 | 550.0 |
| L4-052 | 495.0 | 0 | 0 | 495.0 | L4-098 | 550.0 | 0 | 0 | 550.0 |
| L4-053 | 495.0 | 0 | 0 | 495.0 | L4-099 | 550.0 | 0 | 0 | 550.0 |
| L4-054 | 495.0 | 0 | 0 | 495.0 | L4-100 | 660.0 | 0 | 0 | 660.0 |
| L4-055 | 990.0 | 0 | 0 | 990.0 | L4-101 | 660.0 | 0 | 0 | 660.0 |
| L4-056 | 990.0 | 0 | 0 | 990.0 | L4-102 | 660.0 | 0 | 0 | 660.0 |
| L4-057 | 990.0 | 0 | 0 | 990.0 | L4-103 | 720.0 | 0 | 0 | 720.0 |
| L4-058 | 1080.0 | 0 | 0 | 1080.0 | L4-104 | 660.0 | 0 | 0 | 660.0 |
| L4-059 | 990.0 | 0 | 0 | 990.0 | L4-105 | 660.0 | 0 | 0 | 660.0 |
| L4-060 | 990.0 | 0 | 0 | 990.0 | L4-106 | 660.0 | 0 | 0 | 660.0 |
| L4-061 | 990.0 | 0 | 0 | 990.0 | L4-107 | 660.0 | 0 | 0 | 660.0 |
| L4-062 | 990.0 | 0 | 0 | 990.0 | L4-108 | 660.0 | 0 | 0 | 660.0 |
| L4-063 | 990.0 | 0 | 0 | 990.0 | L4-109 | 495.0 | 0 | 0 | 495.0 |
| L4-064 | 550.0 | 0 | 0 | 550.0 | L4-110 | 495.0 | 0 | 0 | 495.0 |
| L4-065 | 550.0 | 0 | 0 | 550.0 | L4-111 | 495.0 | 0 | 0 | 495.0 |
| L4-066 | 550.0 | 0 | 0 | 550.0 | L4-112 | 540.0 | 0 | 0 | 540.0 |
| L4-067 | 600.0 | 0 | 0 | 600.0 | L4-113 | 495.0 | 0 | 0 | 495.0 |
| L4-068 | 550.0 | 0 | 0 | 550.0 | L4-114 | 495.0 | 0 | 0 | 495.0 |
| L4-069 | 550.0 | 0 | 0 | 550.0 | L4-115 | 495.0 | 0 | 0 | 495.0 |
| L4-070 | 550.0 | 0 | 0 | 550.0 | L4-116 | 495.0 | 0 | 0 | 495.0 |
| L4-071 | 550.0 | 0 | 0 | 550.0 | L4-117 | 495.0 | 0 | 0 | 495.0 |
| L4-072 | 550.0 | 0 | 0 | 550.0 | L4-118 | 275.0 | 0 | 0 | 275.0 |
| L4-073 | 660.0 | 0 | 0 | 660.0 | L4-119 | 275.0 | 0 | 0 | 275.0 |
| L4-074 | 660.0 | 0 | 0 | 660.0 | L4-120 | 275.0 | 0 | 0 | 275.0 |
| L4-075 | 660.0 | 0 | 0 | 660.0 | L4-121 | 300.0 | 0 | 0 | 300.0 |
| L4-076 | 720.0 | 0 | 0 | 720.0 | L4-122 | 275.0 | 0 | 0 | 275.0 |
| L4-077 | 660.0 | 0 | 0 | 660.0 | L4-123 | 275.0 | 0 | 0 | 275.0 |
| L4-078 | 660.0 | 0 | 0 | 660.0 | L4-124 | 275.0 | 0 | 0 | 275.0 |
| L4-079 | 660.0 | 0 | 0 | 660.0 | L4-125 | 275.0 | 0 | 0 | 275.0 |
| L4-080 | 660.0 | 0 | 0 | 660.0 | L4-126 | 275.0 | 0 | 0 | 275.0 |
| L4-081 | 660.0 | 0 | 0 | 660.0 | L4-127 | 330.0 | 0 | 0 | 330.0 |
| L4-082 | 990.0 | 0 | 0 | 990.0 | L4-128 | 330.0 | 0 | 0 | 330.0 |
| L4-083 | 990.0 | 0 | 0 | 990.0 | L4-129 | 330.0 | 0 | 0 | 330.0 |
| L4-084 | 990.0 | 0 | 0 | 990.0 | L4-130 | 360.0 | 0 | 0 | 360.0 |
| L4-085 | 1080.0 | 0 | 0 | 1080.0 | L4-131 | 330.0 | 0 | 0 | 330.0 |
| L4-086 | 990.0 | 0 | 0 | 990.0 | L4-132 | 330.0 | 0 | 0 | 330.0 |
| L4-087 | 990.0 | 0 | 0 | 990.0 | L4-133 | 330.0 | 0 | 0 | 330.0 |
| L4-088 | 990.0 | 0 | 0 | 990.0 | L4-134 | 330.0 | 0 | 0 | 330.0 |

*Fig. 18B*

| [1] | XX | XI | XO | XS | [1] | XX | XI | XO | XS |
|---|---|---|---|---|---|---|---|---|---|
| L4-135 | 330.0 | 0 | 0 | 330.0 | L4-181 | 330.0 | 0 | 0 | 330.0 |
| L4-136 | 495.0 | 0 | 0 | 495.0 | L4-182 | 330.0 | 0 | 0 | 330.0 |
| L4-137 | 495.0 | 0 | 0 | 495.0 | L4-183 | 330.0 | 0 | 0 | 330.0 |
| L4-138 | 495.0 | 0 | 0 | 495.0 | L4-184 | 360.0 | 0 | 0 | 360.0 |
| L4-139 | 540.0 | 0 | 0 | 540.0 | L4-185 | 330.0 | 0 | 0 | 330.0 |
| L4-140 | 495.0 | 0 | 0 | 495.0 | L4-186 | 330.0 | 0 | 0 | 330.0 |
| L4-141 | 495.0 | 0 | 0 | 495.0 | L4-187 | 330.0 | 0 | 0 | 330.0 |
| L4-142 | 495.0 | 0 | 0 | 495.0 | L4-188 | 330.0 | 0 | 0 | 330.0 |
| L4-143 | 495.0 | 0 | 0 | 495.0 | L4-189 | 330.0 | 0 | 0 | 330.0 |
| L4-144 | 495.0 | 0 | 0 | 495.0 | L4-190 | 495.0 | 0 | 0 | 495.0 |
| L4-145 | 275.0 | 0 | 0 | 275.0 | L4-191 | 495.0 | 0 | 0 | 495.0 |
| L4-146 | 275.0 | 0 | 0 | 275.0 | L4-192 | 495.0 | 0 | 0 | 495.0 |
| L4-147 | 275.0 | 0 | 0 | 275.0 | L4-193 | 540.0 | 0 | 0 | 540.0 |
| L4-148 | 300.0 | 0 | 0 | 300.0 | L4-194 | 495.0 | 0 | 0 | 495.0 |
| L4-149 | 275.0 | 0 | 0 | 275.0 | L4-195 | 495.0 | 0 | 0 | 495.0 |
| L4-150 | 275.0 | 0 | 0 | 275.0 | L4-196 | 495.0 | 0 | 0 | 495.0 |
| L4-151 | 275.0 | 0 | 0 | 275.0 | L4-197 | 495.0 | 0 | 0 | 495.0 |
| L4-152 | 275.0 | 0 | 0 | 275.0 | L4-198 | 495.0 | 0 | 0 | 495.0 |
| L4-153 | 275.0 | 0 | 0 | 275.0 | L4-199 | 275.0 | 0 | 0 | 275.0 |
| L4-154 | 330.0 | 0 | 0 | 330.0 | L4-200 | 275.0 | 0 | 0 | 275.0 |
| L4-155 | 330.0 | 0 | 0 | 330.0 | L4-201 | 275.0 | 0 | 0 | 275.0 |
| L4-156 | 330.0 | 0 | 0 | 330.0 | L4-202 | 300.0 | 0 | 0 | 300.0 |
| L4-157 | 360.0 | 0 | 0 | 360.0 | L4-203 | 275.0 | 0 | 0 | 275.0 |
| L4-158 | 330.0 | 0 | 0 | 330.0 | L4-204 | 275.0 | 0 | 0 | 275.0 |
| L4-159 | 330.0 | 0 | 0 | 330.0 | L4-205 | 275.0 | 0 | 0 | 275.0 |
| L4-160 | 330.0 | 0 | 0 | 330.0 | L4-206 | 275.0 | 0 | 0 | 275.0 |
| L4-161 | 330.0 | 0 | 0 | 330.0 | L4-207 | 275.0 | 0 | 0 | 275.0 |
| L4-162 | 330.0 | 0 | 0 | 330.0 | L4-208 | 330.0 | 0 | 0 | 330.0 |
| L4-163 | 495.0 | 0 | 0 | 495.0 | L4-209 | 330.0 | 0 | 0 | 330.0 |
| L4-164 | 495.0 | 0 | 0 | 495.0 | L4-210 | 330.0 | 0 | 0 | 330.0 |
| L4-165 | 495.0 | 0 | 0 | 495.0 | L4-211 | 360.0 | 0 | 0 | 360.0 |
| L4-166 | 540.0 | 0 | 0 | 540.0 | L4-212 | 330.0 | 0 | 0 | 330.0 |
| L4-167 | 495.0 | 0 | 0 | 495.0 | L4-213 | 330.0 | 0 | 0 | 330.0 |
| L4-168 | 495.0 | 0 | 0 | 495.0 | L4-214 | 330.0 | 0 | 0 | 330.0 |
| L4-169 | 495.0 | 0 | 0 | 495.0 | L4-215 | 330.0 | 0 | 0 | 330.0 |
| L4-170 | 495.0 | 0 | 0 | 495.0 | L4-216 | 330.0 | 0 | 0 | 330.0 |
| L4-171 | 495.0 | 0 | 0 | 495.0 | | | | | |
| L4-172 | 275.0 | 0 | 0 | 275.0 | | | | | |
| L4-173 | 275.0 | 0 | 0 | 275.0 | | | | | |
| L4-174 | 275.0 | 0 | 0 | 275.0 | | | | | |
| L4-175 | 300.0 | 0 | 0 | 300.0 | | | | | |
| L4-176 | 275.0 | 0 | 0 | 275.0 | | | | | |
| L4-177 | 275.0 | 0 | 0 | 275.0 | | | | | |
| L4-178 | 275.0 | 0 | 0 | 275.0 | | | | | |
| L4-179 | 275.0 | 0 | 0 | 275.0 | | | | | |
| L4-180 | 275.0 | 0 | 0 | 275.0 | | | | | |

Fig. 18C

SYSTEMS AND METHODS FOR PROPAGATING CHANGES IN A DEMAND PLANNING HIERARCHY

FIELD

The technology described herein relates generally to demand planning and more specifically to the management of a demand planning hierarchy.

BACKGROUND

Demand planning applications develop and maintain a comprehensive picture of anticipated demand for an organization's goods and services. Demand planning applications can facilitate communication and collaboration to provide an accurate demand picture.

A demand planning application may utilize a hierarchical data model. A hierarchical data model is a data model in which the data is organized into a tree-like structure. The structure allows representing information using parent/child relationships. For example, a hierarchical data model may be used to store forecasted demands for a product line, such as drink products. In an example hierarchical data model, total forecasted demand for all drink products may be stored at a top level of a hierarchy, while a second level of the hierarchy may contain different types of drinks sold by a company, such as orange juice, pop, and sports drinks. A third level of the hierarchy may retain brands of each type of drink, and a fourth level may store forecasted demands for different packagings for each brand at a stock keeping unit (SKU) level.

SUMMARY

In accordance with the teachings herein, computer-implemented systems and methods are provided for delivering products according to propagated changes in a demand planning hierarchy that includes a plurality of nodes tracked by a data structure, the demand planning hierarchy containing expected demands for a plurality of products at a first level and aggregations of expected demands for multiple products at a second level. Demand planning data may be received and associated with a data structure, wherein the data structure tracks: a product quantity at a node, a one-to-one relationship between the node and a parent node, a one-to-many relationship between the node and children nodes, and a disaggregation factor that identifies how the product quantity at the node is divided among children nodes of the node. A relieving flow and an augmenting flow are associated with the node. A change to the product quantity at the node or the disaggregation factor at the node is received and the data structure for the node is updated based upon the received change.

The product quantity at other nodes in the demand planning hierarchy is updated based upon the update to the data structure based on the received change, where updating the product quantity at other nodes in the demand planning hierarchy includes solving a set of simultaneous equations to generate an updated demand planning hierarchy. The simultaneous equations include a sum of the product quantity at the node and the augmenting flow at the node equaling a sum of product quantities of children nodes of the node and the relieving flow at the node and implementation of the disaggregation factor of the node and other nodes. Solving the set of simultaneous equations includes using an optimization technique where the sum of the augmenting flows and the relieving flows of the node and other nodes is minimized. One or more products may then be delivered according to the updated demand planning hierarchy.

BRIEF DESCRIPTION OF THE DRAWINGS

FIGS. 12-18 depict two examples of propagation of changes through a demand planning hierarchy.

DETAILED DESCRIPTION

Figure 1:
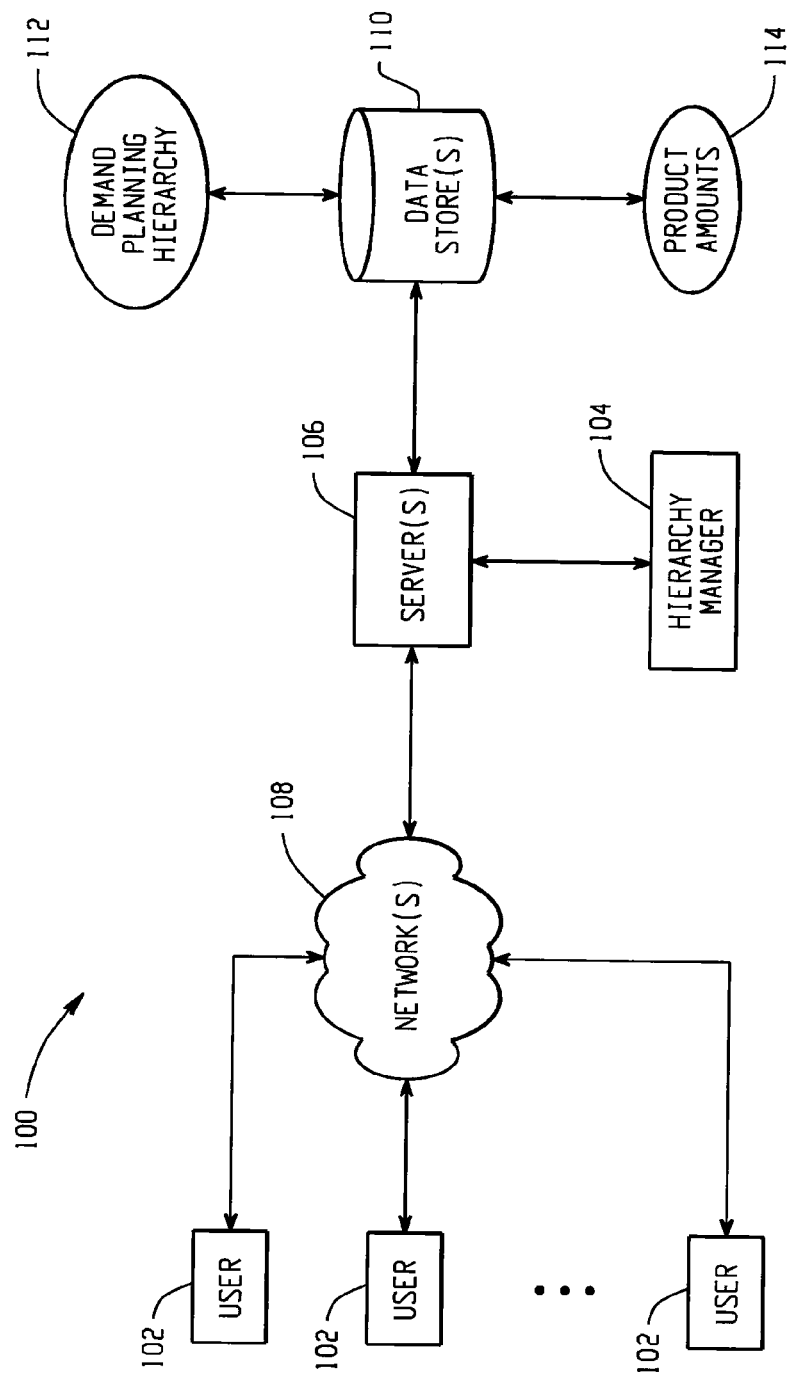
FIG. 1 depicts a computer-implemented environment wherein users can interact with a hierarchy manager hosted on one or more servers through a network.

FIG. 1 depicts a computer-implemented environment wherein users 102 can interact with a hierarchy manager 104 hosted on one or more servers 106 through a network 108. The hierarchy manager 104 enables convenient storage of forecast product demands for multiple products using parent/child relationships. Using these product/child relationships, it is possible to drill down through different levels of aggregations to view product demand data at a desired level of granularity. For example, a first level of the hierarchy may retain product demand data for a product family (e.g., drinks). A next level may contain product demand data for product types within a product family (e.g., soda pop and sports drinks). A subsequent level may contain product demand data for brands within a product type (e.g., cola, clear soda, root beer). A further level may contain product demand data for individual packagings for a brand at a stock keeping unit (SKU) level (e.g., 6 pack of 12 oz. cans, 2-Liter bottle).

In addition to maintaining a data structure containing the product demand data, the hierarchy manager 104 may also be utilized to propagate changes through the hierarchy when data at one of the nodes of the hierarchy is changed. For example, in one demand planning configuration, a constraint may be implemented where a forecasted demand for a parent node is equal to the sum of all forecasted demands of the parent node's children nodes. Further, each parent node may be associated with a disaggregation factor that dictates how the forecasted demand at the parent node is to be divided among the parent node's children nodes. A change to the product quantity at the node or a change to the disaggregation factor at the node may be received. Based on the above described constraints, the change at the node affects not only the node, but also other nodes within the demand planning hierarchy. The hierarchy manager 104 facilitates propagation of those effects through the demand planning hierarchy to satisfy the constraints.

A hierarchy manager 104 may be utilized in a variety of ways. For example, one or more users 102 may interact with the hierarchy manager 104 to make changes to the demand planning hierarchy. For example, a user 102 may change and/or lock a forecasted demand for a node of the hierarchy, or may change a disaggregation factor of a node. A user 102 may also make similar changes at other nodes in the demand planning hierarchy. Further, a different user 102 may change or lock values at one or more nodes of the demand planning hierarchy. For example, a marketing employee may be aware of a promotion involving a certain demand for a brand of product during an upcoming time period, such as a week. In light of the upcoming promotion, the marketing employee may double the forecasted demand for the brand for the next week and lock that value. As another example, a demand planner or operations planner may perform a scenario analysis and may change a forecasted demand or disaggregation factor at a node based on the results of the scenario analysis. In response to these changes made by one or more users 102, the hierarchy manager 104 may propagate effects of those changes to other nodes in the demand planning hierarchy.

The users 102 can interact with the system 104 through a number of ways, such as over one or more networks 108. One or more servers 106 accessible through the network(s) 108 can host the hierarchy manager 104. The one or more servers 106 are responsive to one or more data stores 110 for providing input data to the hierarchy manager 104. Among the data contained on the one or more data stores 110 may be metadata regarding the structure of a demand planning hierarchy 112 as well as forecasted demand product amounts 114. It should be understood that the hierarchy manager 104 could also be provided on a stand-alone computer for access by a user 102.

Figure 2:
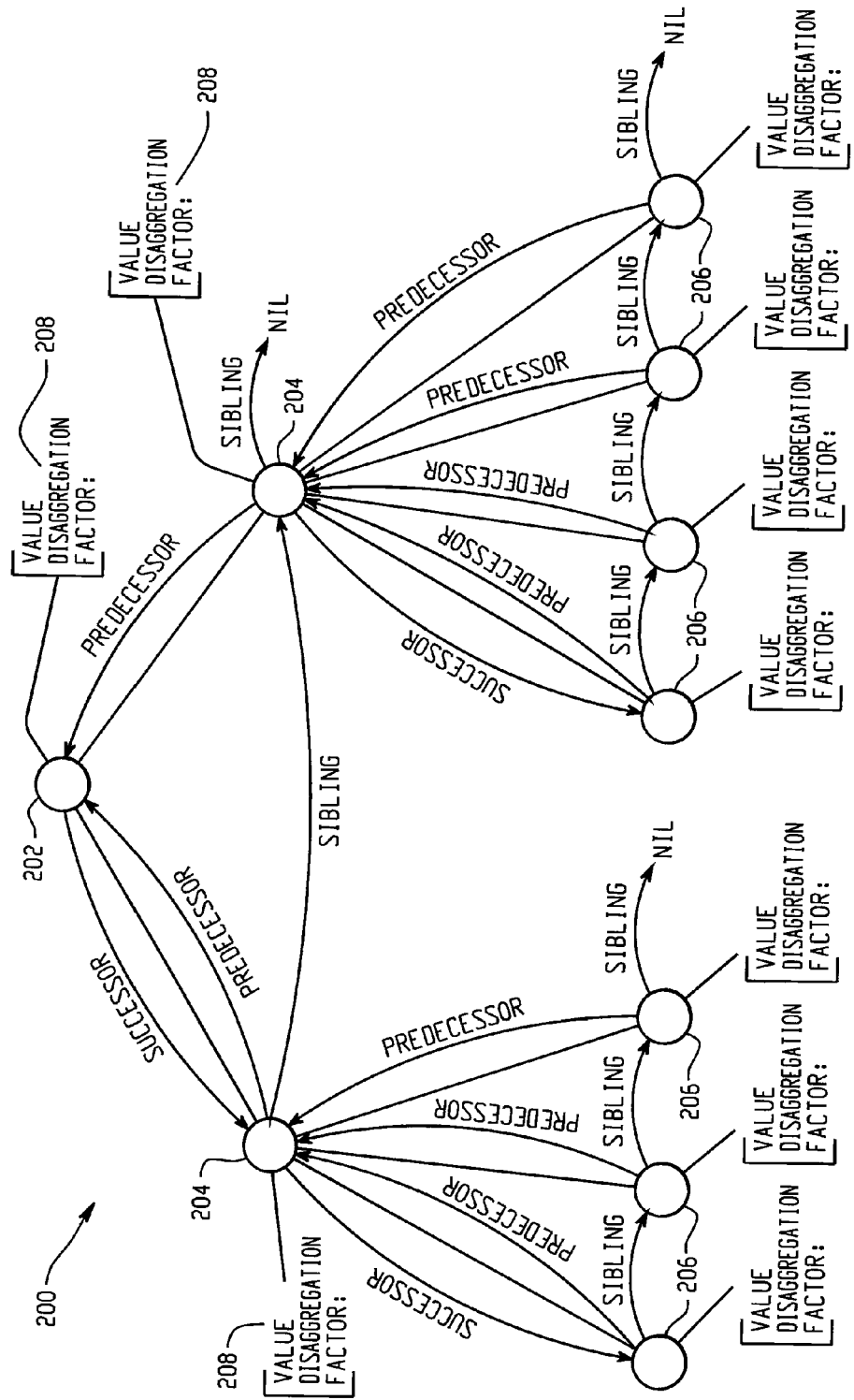
FIG. 2 depicts an example demand planning hierarchy.

FIG. 2 depicts an example demand planning hierarchy. The demand planning hierarchy 200 includes a root node 202, two children nodes 204 of the root node 202 and seven grandchildren nodes 206 of the root node 202. The depiction of FIG. 2 illustrates the relationships among the nodes 202, 204, 206 of the demand planning hierarchy 200. For example, nodes within the same level of the hierarchy 200 (e.g., the two nodes labeled 204) are considered siblings. As a further example, a node 204 one level higher than one or more children nodes 206 is considered a predecessor or parent node to the one or more children nodes. A disaggregation factor 208 is associated with each node associated with one or more children nodes. A disaggregation factor 208 may also be associated with a node that has no children nodes (e.g., the grandchildren nodes 206 of the root node 202). The disaggregation factor describes how the forecasted demand at a parent node is to be distributed among the parent node's children nodes. For example, for a parent node having three children nodes, the disaggregation factor may dictate that 35% of the forecasted demand at the parent node be distributed to a first child node, 40% be distributed to a second child node, and 25% be distributed to a third child mode. Disaggregation factors may be expressed in other ways such as explicit values for distribution (e.g., first 500 of a product are distributed to a first child node, remainder to a second child node).

Figure 3:
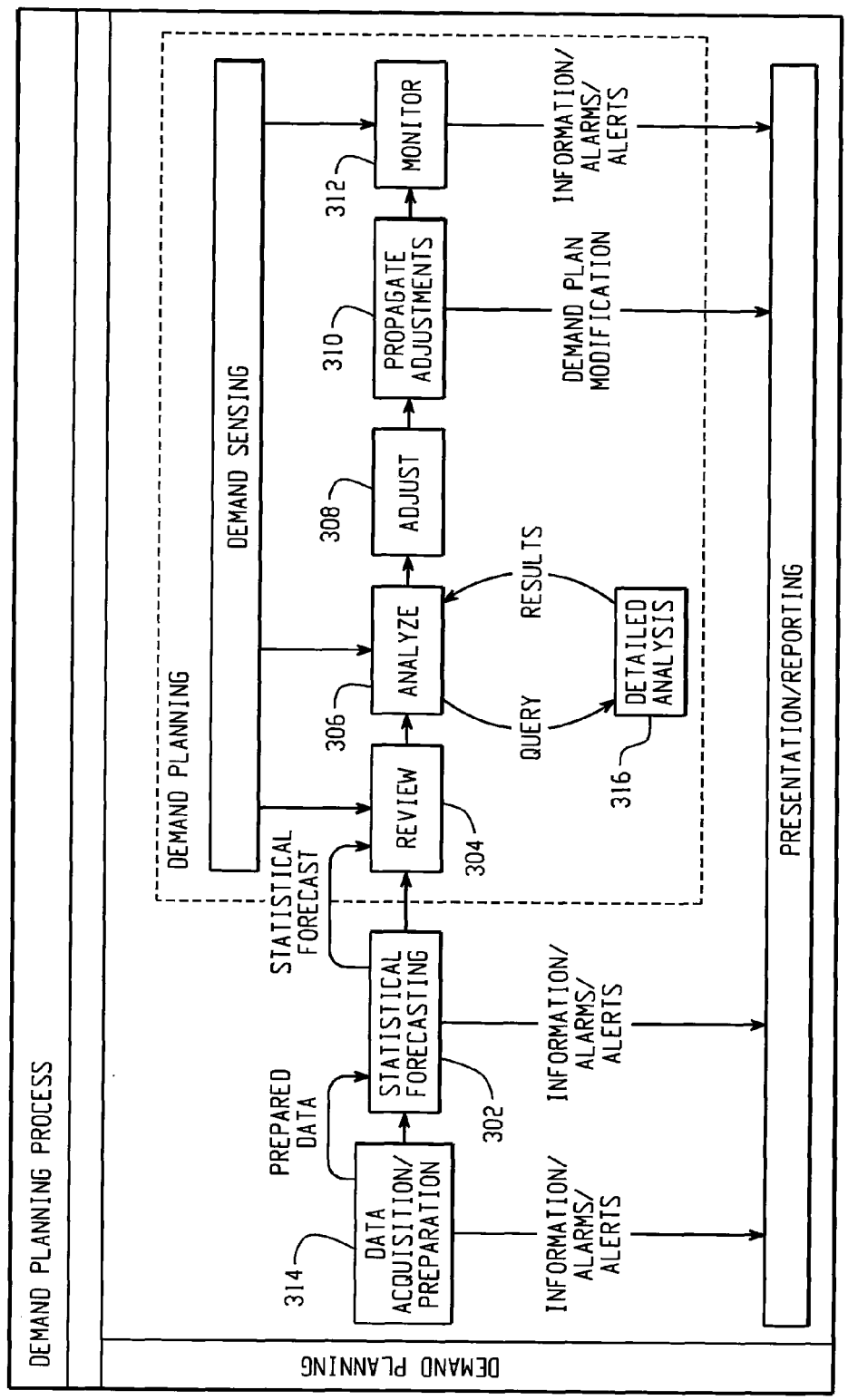
FIG. 3 is a block diagram depicting an example demand planning process.

FIG. 3 is a block diagram depicting an example demand planning process. The example demand planning process 300 includes six components: forecasting 302, review 304, analysis 306, adjusting 308, propagating adjustments 310, and monitoring 312. Data is acquired and prepared at 314. At 302, one or more statistical forecasts are performed on the acquired data. The results of the statistical forecasting may be reviewed at 304 and analyzed at 306. The analysis at 306 may include a detailed analysis 316 via one or more queries and associated results. At 308, the results of the analysis stage 316 may be used to adjust the demand planning hierarchy (e.g., changes to forecast demand product quantities and/or disaggregation factors at one or more nodes). Adjustments are propagated at 310, and the performance of the forecasted demand planning hierarchy is monitored at 312.

During the adjust step 308, demand planners or other interest parties, such as brand managers and sales managers, interact with the demand plan by making changes to values at various levels of the planning hierarchy and possibly locking the values to specific numbers. These adjustments may in turn cause other values up and down the planning hierarchy to change, an adjustment propagation. Adjustment propagation may be performed in real-time after a change is made, periodically (e.g., every hour), or at some other interval.

Because demand planning may be performed over an elaborate planning hierarchy, the adjustments made in previous steps may affect values up and/or down the tree. Because the number of nodes in a planning hierarchy can easily exceed 250,000, it is essential that a propagation mechanism utilized be fast and efficient.

For one example demand planning hierarchy, a hierarchy manager is required to: aggregate lower level adjustments up through the demand planning hierarchy; disaggregate upper level adjustments down the planning hierarchy to lower level nodes (e.g., using historical splits or user controlled percentages that may be in the form of disaggregation factors); perform mixed adjustment propagation by disaggregating down to lower level nodes and aggregating up to higher level nodes that may include the root node; enforce locked values anywhere within the planning hierarchy; and identify inconsistent locks and inform the user of inconsistent locks.

Figure 4:
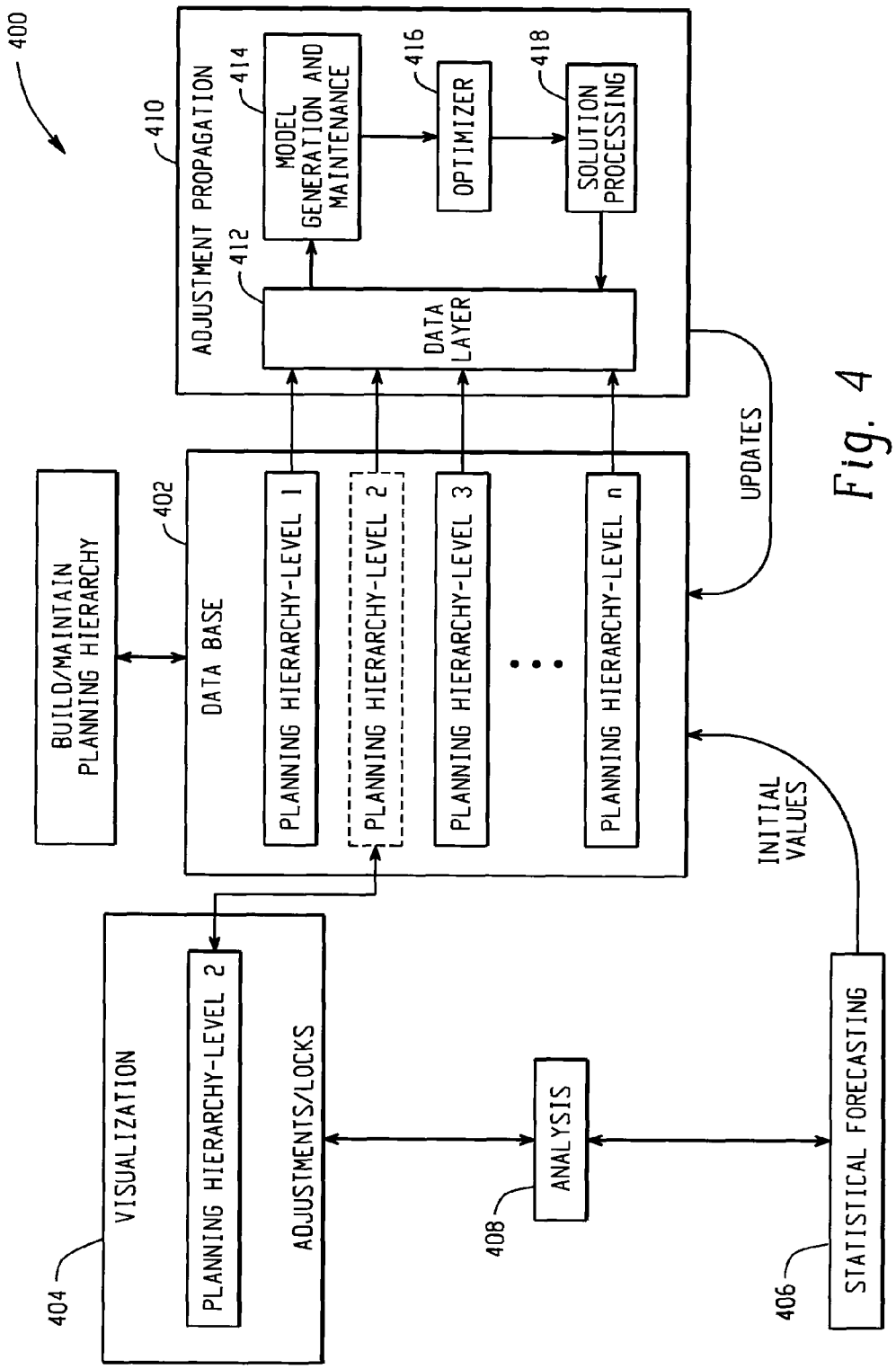
FIG. 4 depicts an example high-level architecture for a decision support system capable of supporting a demand planning process.

FIG. 4 depicts an example architecture for a decision support system configured to support a demand planning process. An application to support the demand planning process may have five components: a database 402 to support the data structures that receive or create and maintain the demand planning hierarchy; visualization capability 404 that supports changes and locks to data in the demand planning hierarchy; statistical forecasting capability 406; analysis capability 408 supporting data acquisition and preparation and model construction; and adjustment propagation capability 410 for propagating adjustments up and down the planning hierarchy.

An example adjustment propagation mechanism 410 may have a data layer 412, a model generation and maintenance component 414, an optimization engine 416, and a solution processing component 418. The data layer 412 receives information about the structure of the planning hierarchy and the current values at each node. The received data is processed to put the data into a form that is suitable for the model generator 414.

The model generator 414 constructs an instance of the optimization model underlying the adjustment propagation problem. The model instance is constructed from the data received via the data layer under control of the mathematical formulation. The model generation and maintenance component also may allow for the maintenance of the mathematical optimization problem formulation to allow more sophisticated requirements and constraints to be added for differing forms of a planning hierarchy.

The optimization engine 416 solves the model instance using optimization algorithms appropriate to the form of the underlying mathematical optimization problem. For some demand planning hierarchies, the problem may be structured as a linear problem solvable using a Primal Simplex Algorithm, a Dual Simplex algorithm, or a Network Optimization Algorithm. The output of the optimization may be processed at 418, and the updated values may be sent back to the data layer 412 for transmission back to the database 402.

Figure 5:
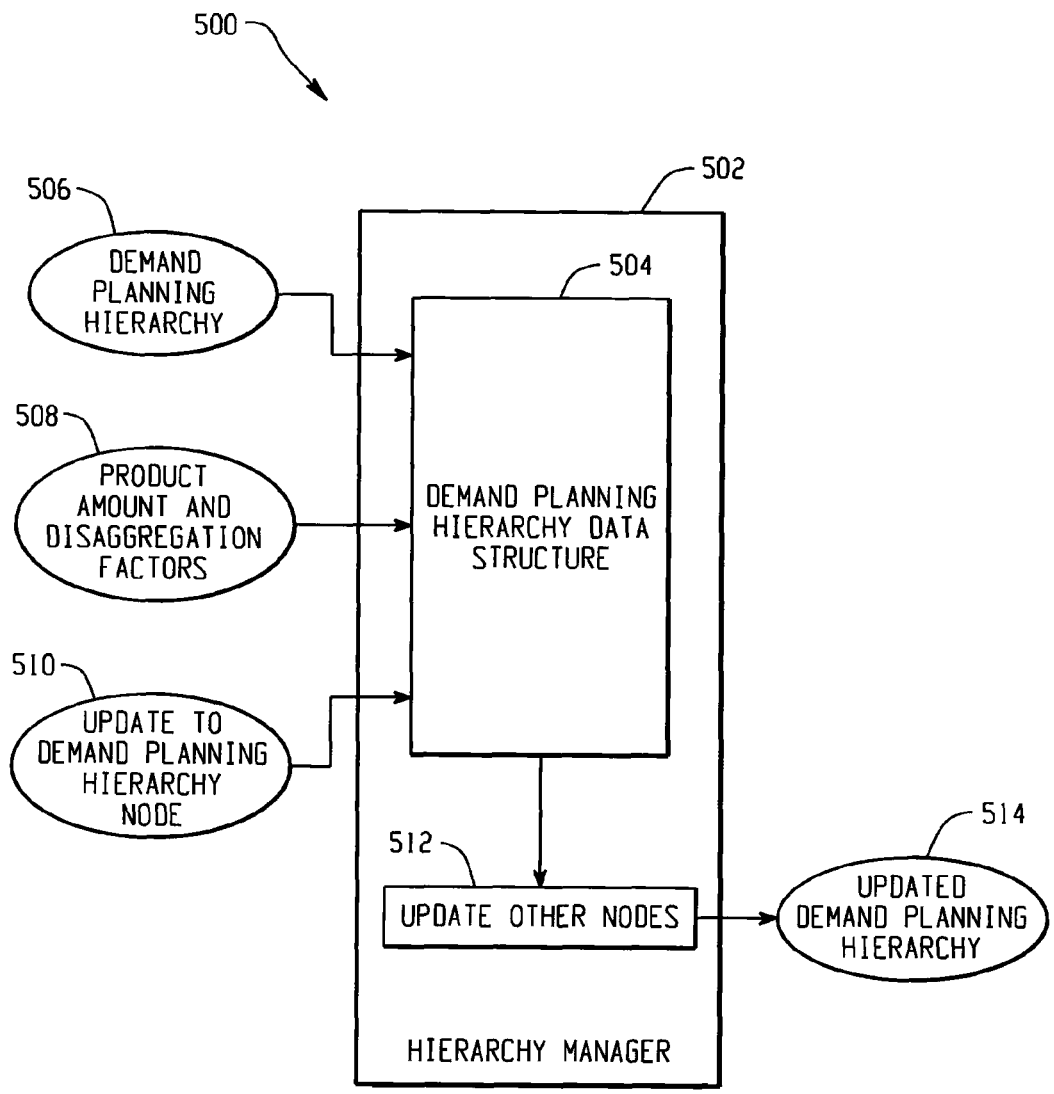
FIG. 5 is a block diagram depicting a computer-implemented system for propagating changes in a demand planning hierarchy.

FIG. 5 is a block diagram depicting a computer-implemented system for propagating changes in a demand planning hierarchy. A hierarchy manager maintains a demand planning hierarchy data structure 504. The data structure 504 tracks data related to a received demand planning hierarchy 506. The demand planning hierarchy includes a plurality of nodes, where the demand planning hierarchy contains expected demands for a plurality of products at a first level and aggregations of expected demands for multiple products at a second level closer to the root node than the first level.

The demand planning hierarchy data structure tracks data for the different nodes of the received demand planning hierarchy 506. For example, the demand planning hierarchy data structure 504 may track data related to the structure of the received demand planning hierarchy 506. For example, the demand planning hierarchy data structure 504 may track a one-to-one relationship between a node and its parent node. The demand planning hierarchy data structure 504 may further track a one-to-many relationship between the node and its children nodes. As a further example, the demand planning hierarchy data structure may track other data received at 508, such as an expected product demand quantity at a node and a disaggregation factor that identifies how the expected product demand quantity at the node is divided among children nodes of the node.

The hierarchy manager 502 may further receive an update to a demand planning hierarchy node at 510. For example, the hierarchy manager may receive an updated expected product demand quantity at a node. Such an updated expected product demand quantity could be based on a new forecast or simulation or could be based on new knowledge, such as knowledge of an upcoming advertising campaign. Upon receipt of an updated expected product demand quantity at a node, the expected product demand quantity for that node is revised per the updated value and locked prior to propagation of effects of the update to the other nodes of the demand planning hierarchy 506. As another example, an updated disaggregation factor could be received for a node at 510. Upon receipt of an updated disaggregation factor for a node, the disaggregation factor for that node is revised per the updated value prior to propagation to the other nodes of the demand planning hierarchy 506. At 512, the received updates to one or more of the demand planning hierarchy nodes 510 are propagated through the other nodes of the demand planning hierarchy using the demand planning hierarchy data structure 504, and at 514, an updated demand planning hierarchy is outputted from the hierarchy manager 502.

Figure 6:
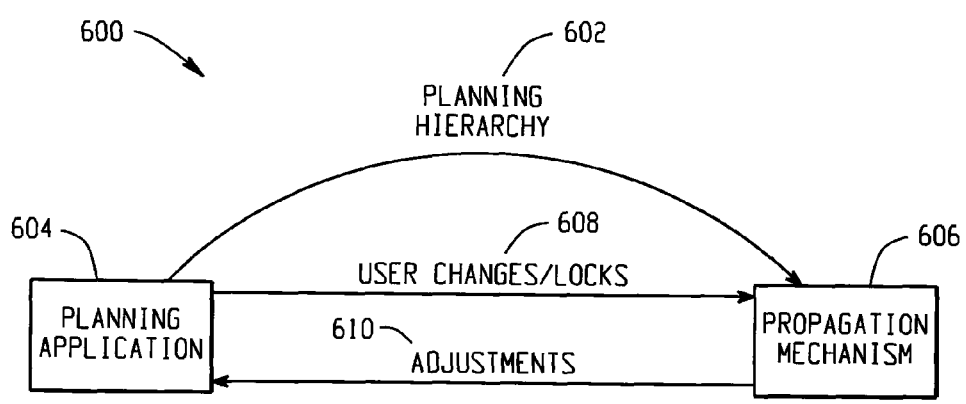
FIG. 6 is a block diagram depicting an example data flow between a planning application and a propagation mechanism.

FIG. 6 is a block diagram depicting an example data flow between a planning application and a propagation mechanism. A state of the planning hierarchy 602, such as an initial state, is transferred from the planning application 604 to the propagation mechanism 606. The planning application 604 further transfers one or more user changes or locks 608 to the propagating mechanism 606. For example, the planning application may transfer one or more forecasted product demand quantities for nodes within the planning hierarchy 602 as well as changes to disaggregation factors for nodes within the planning hierarchy 602. The propagation mechanism 606 propagates changes in the planning hierarchy 602 based on the received changes and returns adjustments 610 caused by the propagation to the planning application 604.

Figure 7:
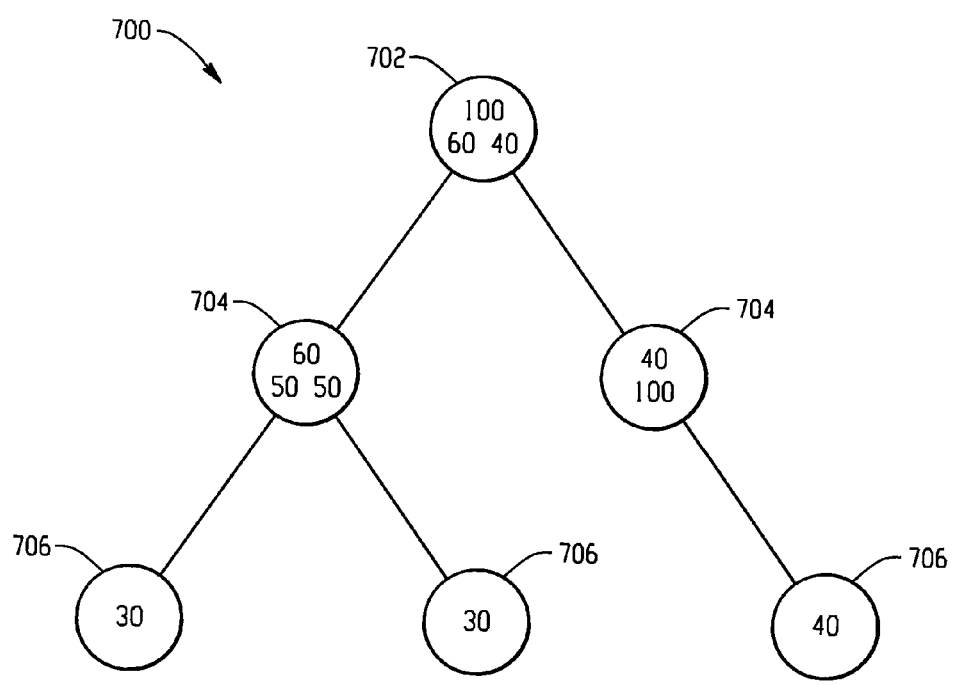
FIGS. 7-9 depict example propagations through a hierarchy.
Figure 8:
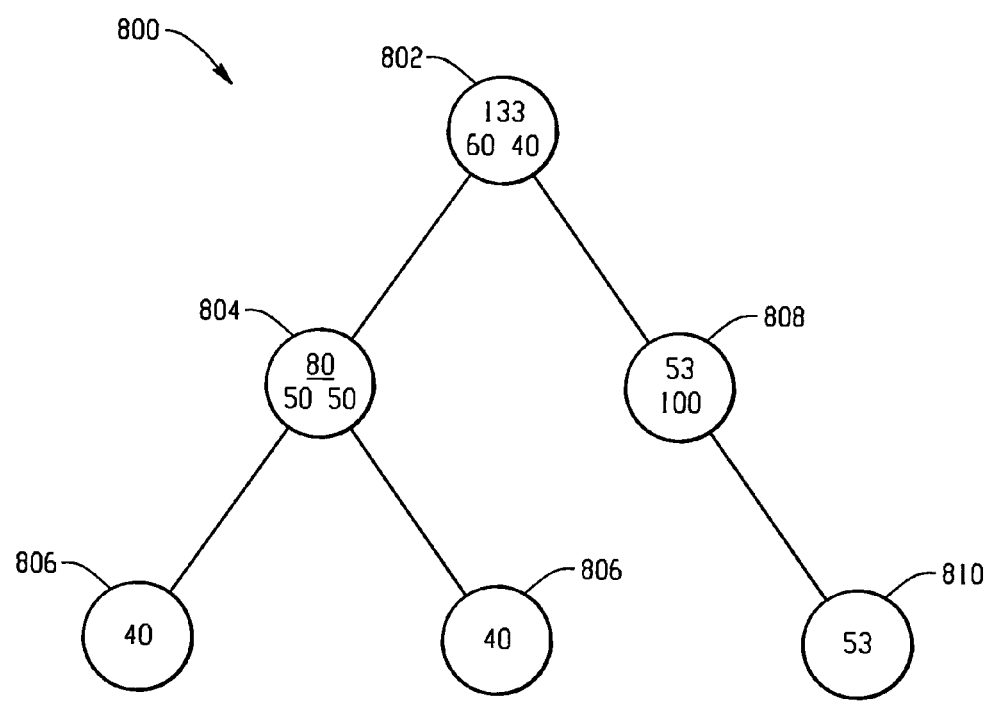
Figure 9:
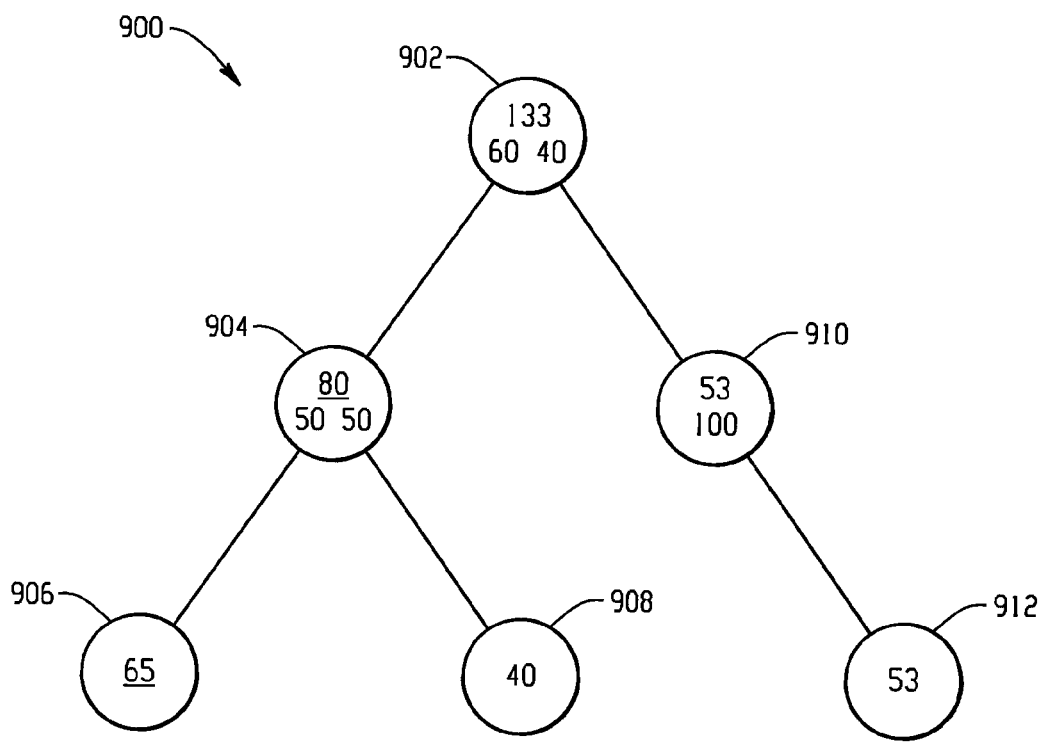

FIGS. 7-9 depict example propagations through a hierarchy. FIG. 7 depicts a three level hierarchy that includes a root node 702, two children nodes 704 of the root node 702, and 3 grandchildren nodes 706 of the root node 702. The root node 702 includes a forecasted demand of 100 and a disaggregation factor of 60, 40, meaning that 60% of the demand of the root node 702 is disaggregated to the left child node 704 and 40% of the forecasted demand for the root node 702 is disaggregated to the right child node 704. Accordingly, the forecasted demand at the left child node 704 is 60 and the forecasted demand at the right child node 704 is 40. As dictated by the 50, 50 disaggregation factor at the left child node 704, the forecasted demand at the left child node 704 is split evenly to the left child node's children 706, and all of the forecasted demand at the right child node 704 is passed to the right child node's only child 706. Nodes having no children, such as the grandchildren nodes 706, may or may not have associated disaggregation factors.

FIG. 8 depicts a locking of a forecasted demand quantity at the left child node 804 at 80. This could be done, for example, by a demand planner as a result of a scenario analysis he performed. In response to the locking of the value at the left child node 804, the hierarchy manager propagates any changes required by the locking through the hierarchy 800. Such propagation may be in real-time (e.g., almost immediately after locking the value), at a prespecified time, or at a prespecified time interval. In propagating the changes required by the locking of the forecasted demand quantity at the left child node 804, that locked demand value is split evenly, according to the left child node's disaggregation value, to the grandchildren nodes 806. Changes from the locking of the value at 804 also propagate up the hierarchy to the root node 802, where the forecasted demand quantity is adjusted so that the disaggregation value at the root node remains implemented (i.e., 60% of the forecasted demand at the root node is 80). The change to the forecasted demand quantity at the root node 802 requires propagation down the right branch of the hierarchy 808, 810 according to the disaggregation factors as shown.

FIG. 9 depicts an example hierarchy having a second forecasted demand quantity locked at 906. This could be done, for example, by a marketing employee in view of an upcoming promotion related to the product represented by node 906. The hierarchy manager attempts to propagate changes necessitated by the two locked values through the hierarchy. However, the two locked values create an inconsistent lock. It is impossible for the forecasted demand quantity of 80 at 904 to be split evenly according to the disaggregation factor at node 904 to result in a forecasted demand quantity of 65 at 906.

Figure 10:
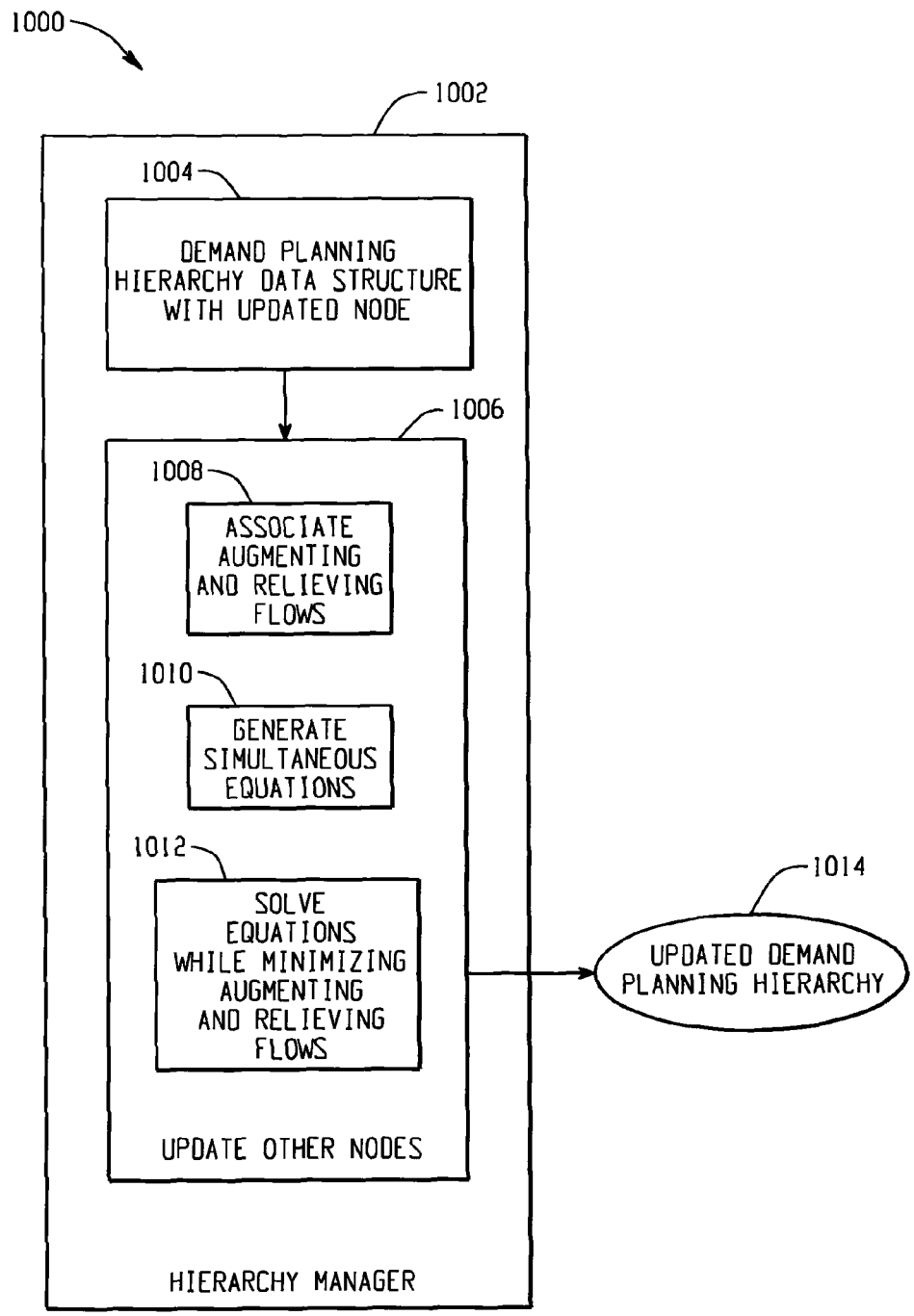
FIG. 10 is a block diagram depicting a hierarchy manager updating other nodes by propagating changes through a demand planning hierarchy.

FIG. 10 is a block diagram depicting a hierarchy manager updating other nodes by propagating changes through a demand planning hierarchy. The propagation mechanism depicted in FIG. 10 is able to gracefully handle the inconsistent locking condition described with respect to FIG. 9 and may identify where in the demand planning hierarchy the inconsistent locking condition exists. As noted previously, the hierarchy manager 1002 receives data regarding the structure of a demand planning hierarchy, initial values for forecasted demand quantities and disaggregation factors at nodes of the demand planning hierarchy, and one or more changes to those quantities and/or factors. The hierarchy manager associates that data with a data structure, as depicted at 1004.

After receiving an update at a node, the hierarchy manager updates other nodes 1006 in the demand planning hierarchy by propagating changes through the hierarchy. To address the possibility of inconsistent locks having been received, an augmenting flow and a relieving flow are associated with each node of the demand planning hierarchy at 1008. An augmenting flow is a temporary flow of forecasted demand quantity into a node, used in the propagation process. A relieving flow is a temporary flow of forecasted demand quantity out of a node, used in the propagation process. Thus, for the purposes of updating nodes at 1006, a node may have up to two input flows (i.e., from its parent node and its associated augmenting flow) and one or more output flows (i.e., to any children nodes and its relieving flow).

After the augmenting and relieving flows are associated with the nodes of the demand planning hierarchy at 1008, a set of simultaneous equations are generated at 1010. The simultaneous equations enforce the structure and any constraints on the demand planning hierarchy. For example, for a node having children nodes, the forecasted demand quantity at the node is equal to the sum of the forecasted demand quantities of that node's children. This relationship is modified by the associated augmenting and relieving flows at the node such that the sum of the forecasted demand quantity at the node plus the node's augmenting flow equals the sum of the forecasted demand quantities of that node's children and that node's relieving flow. The simultaneous equations also implement the disaggregation factors of the nodes within the demand planning hierarchy.

Following generation of the simultaneous equations at 1010, the simultaneous equations are solved using an optimization technique that minimizes the sum of the augmenting flows and the relieving flows of all of the nodes in the demand planning hierarchy, and the updated demand planning hierarchy 1014 is outputted based on the solved equations. If no inconsistent locks are present in the demand planning hierarchy data structure with the updated node 1004, then the optimization will result in the sum of the augmenting flows and the relieving flows being zero. If an inconsistent lock is present, then the sum of the augmenting flows and the relieving flows will not be minimized to zero, and a notification of an inconsistent lock may be generated and stored or provided to a user. A notification of where in the demand planning hierarchy the inconsistent lock exists may also be generated by identifying which node's augmenting and/or relieving flows could not be minimized to zero during the optimization process.

Figure 11:
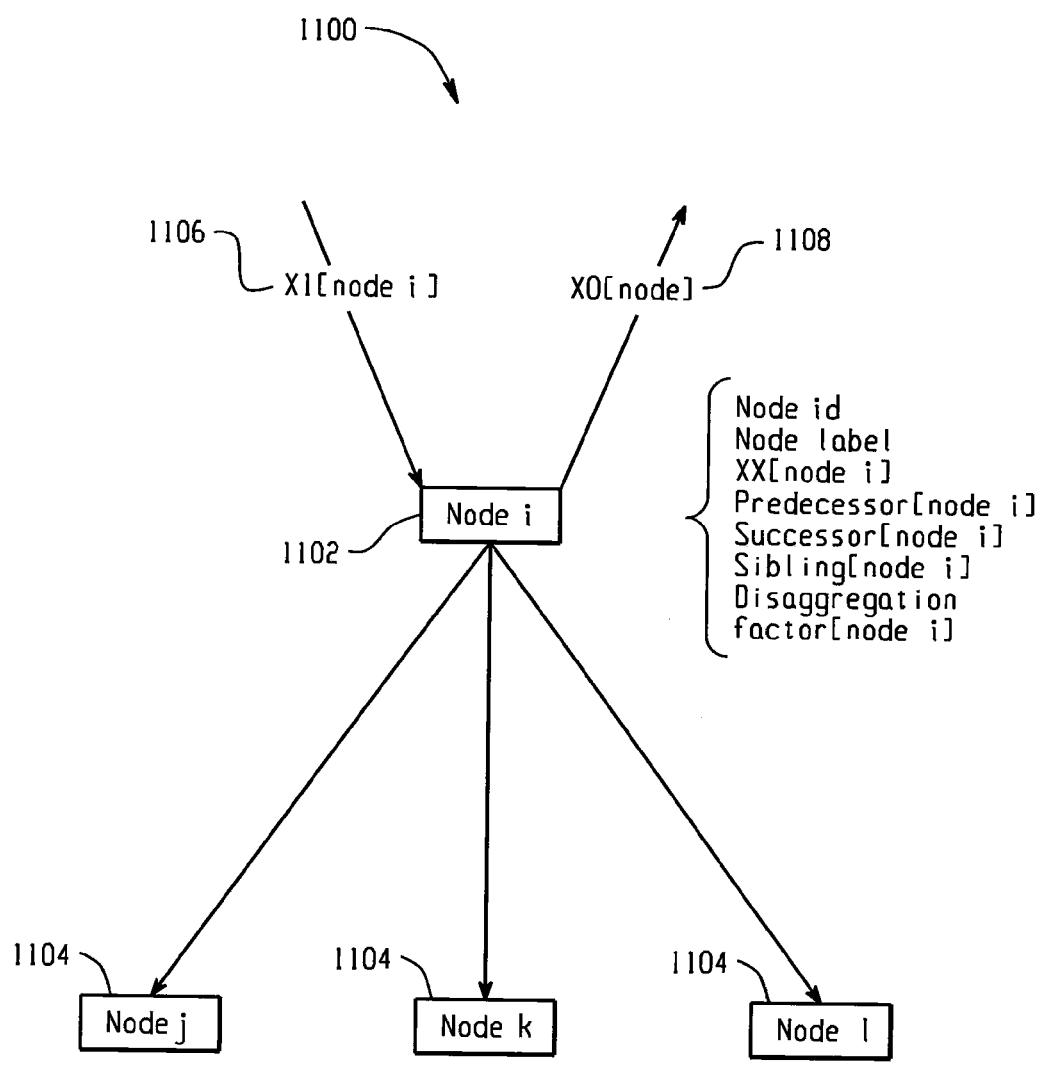
FIG. 11 depicts the association of an augmenting flow into and a relieving flow out of a node.

FIG. 11 depicts the association of an augmenting flow into and a relieving flow out of a node. Node i 1102 is associated with three children nodes 1104 Node j, Node k, and Node l. Node i has associated with it a node id, a node label, a forecasted demand quantity (XX), structural information identifying its predecessor, successors, and siblings, as well as a disaggregation factor. FIG. 11 also depicts the association of an augmenting flow 1106 into Node i and a relieving flow 1108 out of Node i.

After associating the augmenting flow 1106 and the relieving flow 1108 with Node i, the set of simultaneous equations are generated. First, the sum of the product quantity at a node and the augmenting flow at the node is set equal to the sum of the product quantities of the node's children and the relieving flow at the node. This can be represented as:

$$\sum_{\forall j \in \{successor(n)\}} x_j + r_n = x_n + a_n \forall n \in N,$$

where $\sum_{\forall j \in \{successor(n)\}} x_j$ is the sum of all of the children nodes of node n, $r_n$ is the relieving flow at node n, $x_n$ is the forecasted demand quantity at node n, and $a_n$ is the augmenting flow at node n. This equation is applied to all of the N nodes in the demand planning hierarchy. A slack flow term may be added to the left side of the equation for leaf nodes, which have no children nodes to which to disaggregate as:

$$\sum_{\forall j \in \{successor(n)\}} x_j + r_n + x_{slack} = x_n + a_n \forall n \in N,$$

for leaf nodes. Additionally, the disaggregating factors are implemented. This can be represented as:

$$x_n = df_n * x_{predecessor}(n) \forall n \in N,$$

where the forecasted demand quantity at node n ($x_n$) is equal to the disaggregation factor associated with node n ($df_n$) times the forecasted demand quantity at the predecessor of node n. This equation is applied to all of the N nodes in the demand planning hierarchy.

The above described equations can then be solved simultaneously using an optimization technique using the following objective function:

$$\text{minimize} \sum_{\forall n \in N} a_n + r_n,$$

which minimizes the sum of the augmenting and relieving flows at all of the nodes, N, of the demand planning hierarchy.

Figure 12:
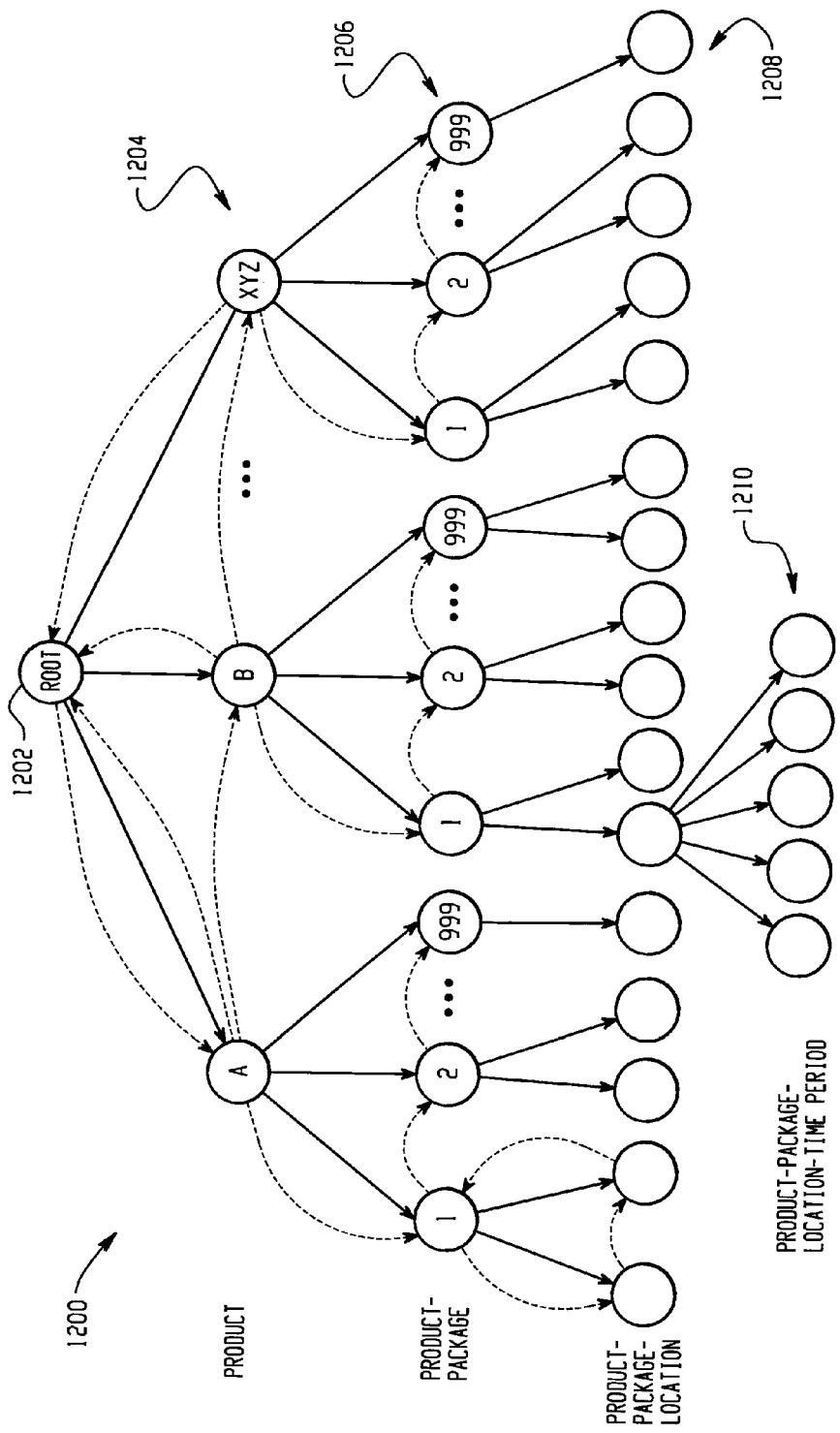

FIGS. 12-18 depict two examples of propagation of changes through a demand planning hierarchy. FIG. 12 depicts a demand planning hierarchy 1200. The demand planning hierarchy includes a root node 1202, a product level 1204, a package level 1206, and a location level 1208. The demand planning hierarchy 1200 can also be further broken down into individual time periods, as shown at 1210.

FIG. 13 depicts an example data structure for tracking the demand planning hierarchy. The planning level two data 1302 describes nodes of the package level 1206, shown in FIG. 12. The planning level two data 1302 includes a description of the product and the package associated with each record. Column 'x' lists a forecasted demand quantity for the node, initially set to zero. The "nid" column lists an identifier for the node, and the "prd," "suc," and "sib" columns list demand planning hierarchy structural data describing the node's predecessor, successor, and next sibling. The planning level two data 1302 further lists a disaggregation factor (df) for the node. The disaggregation factor lists the portion of the parents forecasted demand quantity that should be allocated to the node. As noted above, disaggregation factors can be represented in a variety of forms, such as a description of how forecasted demand quantities should be disaggregated among a node's children.

The planning level three data 1304 describes nodes of the location level 1208, shown in FIG. 12. The planning level three data 1304 includes the columns of the planning level two data 1302 with the addition of a distributor identifier in the "dist" column.

FIG. 14 depicts a listing of partitioning constraints for the level two nodes at the package level. For each of these nodes, the forecasted demand quantity at the node (XX(node)) plus the augmenting flow for the node (XI) minus the forecasted demand quantity at the children of the node (XX(children)) and the relieving flow (XO) are set equal to zero. In other words, the sum of the product quantity at the node and the augmenting flow at the node equals a sum of product quantities of children nodes of the node and the relieving flow at the node.

FIG. 15 depicts implementation of the disaggregation factors at certain of the level two nodes. For example for node "L2-001" at 1502, having a disaggregation factor of 0.5, half of node L2-001's parent node L1-001's relieving flow minus half of L1-001's augmenting flow minus half of L1-001's forecasted demand quantity plus the forecasted demand quantity at node L2-001 is set equal to zero. The other disaggregation factors are similarly applied.

Figure 16B:
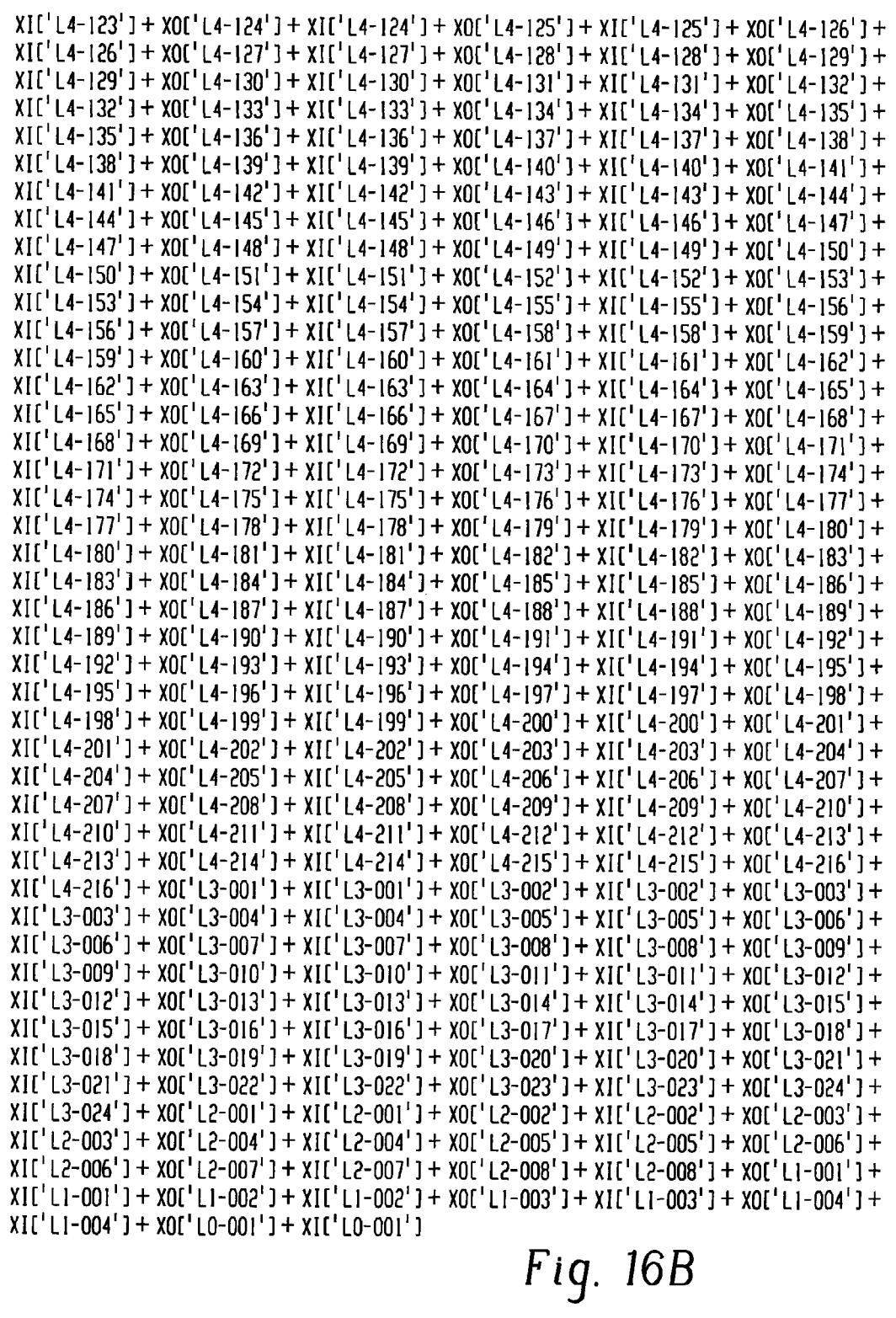

FIGS. 16A and 16B depict the objective function that is sought to be minimized in solving the simultaneous equations. The hierarchy manager seeks to minimize the sum of all of the augmenting flows (XI) and the relieving flows (XO) of all of the nodes in the demand planning hierarchy.

FIGS. 17A-17C depict results of propagating based on a locked value of 120,000 at the root node, L0-001. Because there are no inconsistent locks, after the optimization, all of the augmenting flows (XI) and relieving flows (XO) are equal to zero. The forecasted demand quantities at each of the nodes following the propagation are shown in column XX. The slack flows (XS) associated with each of the leaf nodes is equal to the forecasted demand quantities at the associated leaf node.

FIGS. 18A-18C depict results of propagating based on locked values of 30,000 at L1-001, 40,000 at L1-002, 20,000 at L1-003, and 20,000 at L1-004. The lack of inconsistent locks again results in all of the augmenting flows and relieving flows being equal to zero.

Figure 19:
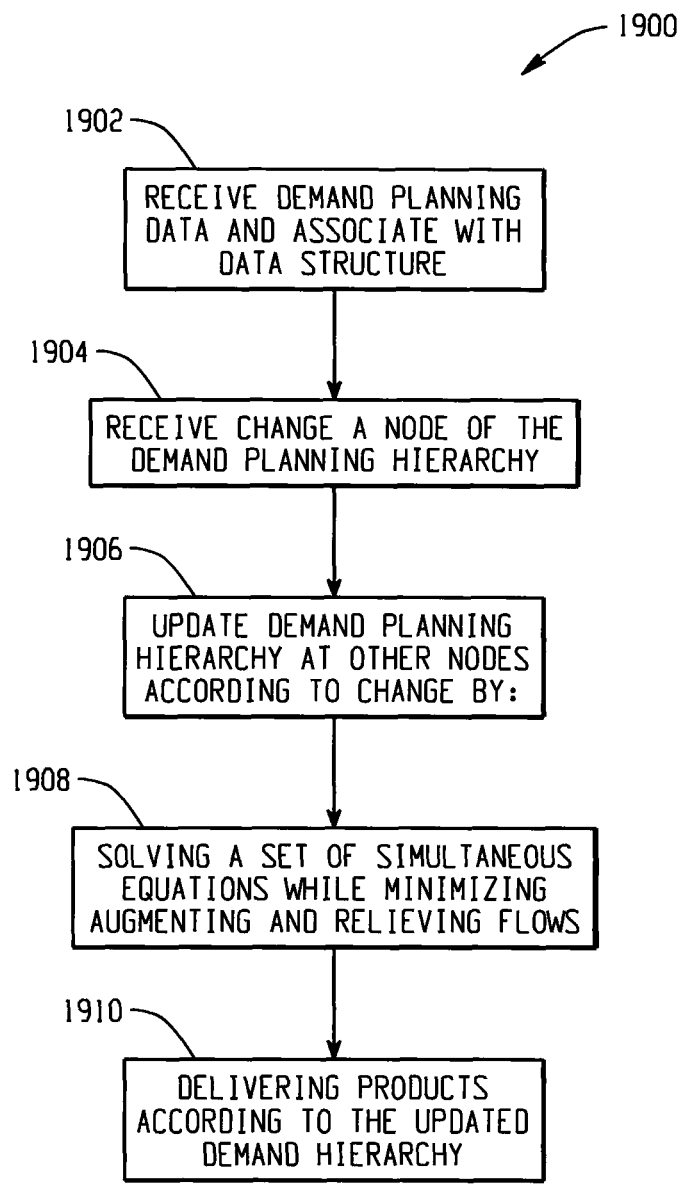
FIG. 19 depicts a computer-implemented method for delivering products according to propagated changes in a demand planning hierarchy that includes a plurality of nodes tracked by a data structure, where the demand planning hierarchy contains expected demands for a plurality of products at a first level and aggregations of expected demands for multiple products at a second level.

FIG. 19 depicts a computer-implemented method for delivering products according to propagated changes in a demand planning hierarchy that includes a plurality of nodes tracked by a data structure, where the demand planning hierarchy contains expected demands for a plurality of products at a first level and aggregations of expected demands for multiple products at a second level. At 1902, demand planning data is received and associated with a data structure. The data structure tracks a product quantity at a node, a one-to-one relationship between the node and a parent node, a one-to-many relationship between the node and children nodes, and a disaggregation factor that identifies how the product quantity at the node is divided among children nodes of the node. A relieving flow and an augmenting flow are also associated with the node. At 1904, a change to the product quantity at the node or the disaggregation factor at the node is received, and the data structure for the node is updated based on the received change. At 1906, the product quantity at other nodes in the demand planning hierarchy is updated based upon the update to the data structure based on the received change. Updating the product quantity at other nodes in the demand planning hierarchy includes solving a set of simultaneous equations to generate an updated demand hierarchy, as shown at 1908. The simultaneous equations include a sum of the product quantity at the node and the augmenting flow at the node equaling a sum of product quantities of children nodes of the node and the relieving flow at the nodes. The simultaneous equations also include implementation of the disaggregation factor of the node and other nodes. Solving the set of simultaneous equations includes using an optimization technique where the sum of the augmenting flows and the relieving flows of the node and other nodes is minimized. At 1910, one or more products are delivered according to the updated demand planning hierarchy.

Figure 20A:
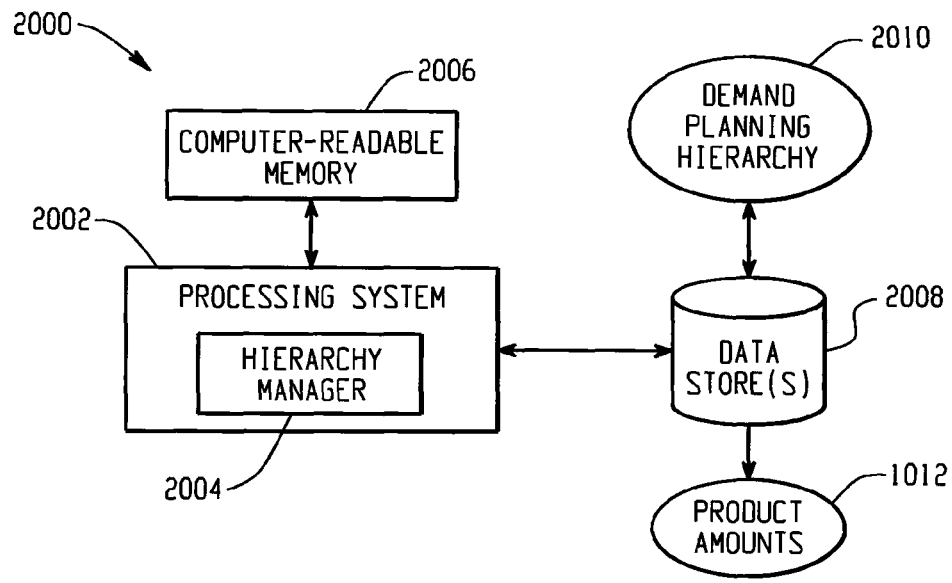
FIGS. 20A, 20B, and 20C depict example processing systems for use in implementing a hierarchy manager.
Figure 20B:
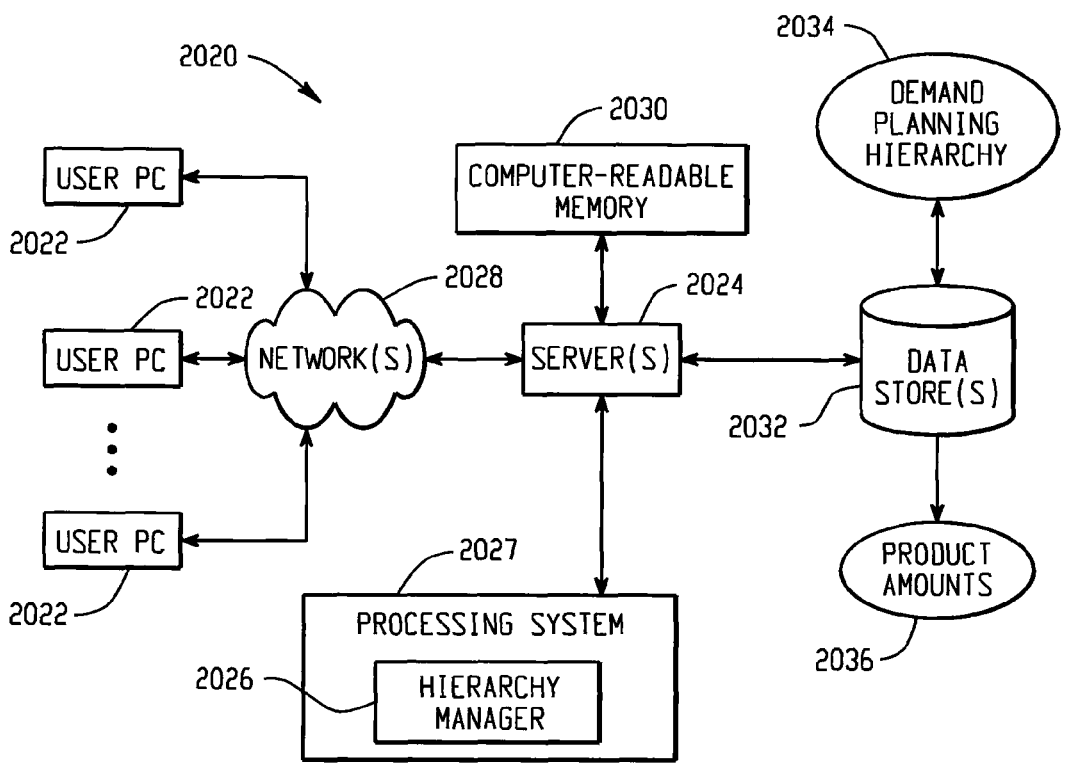
Figure 20C:
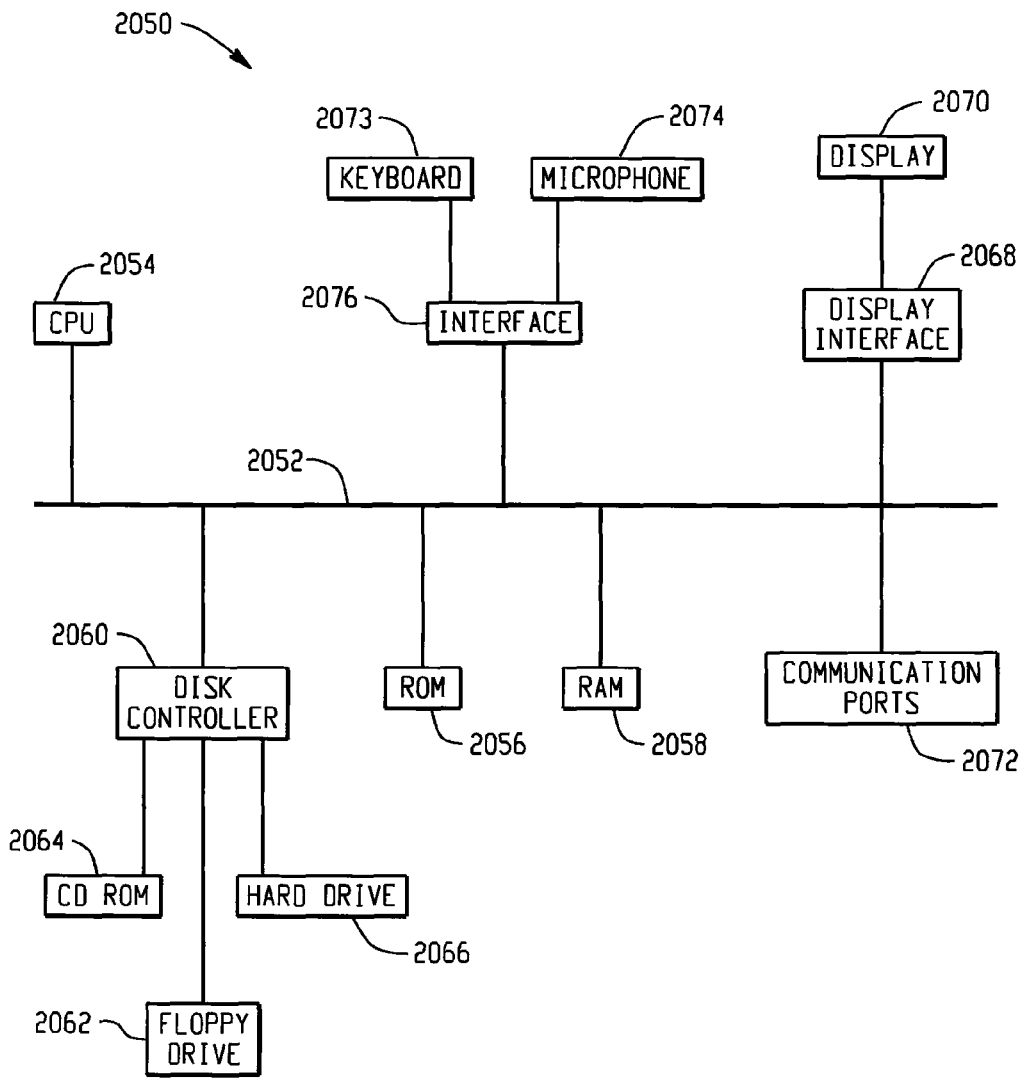

FIGS. 20A, 20B, and 20C depict example processing systems for use in implementing a hierarchy manager. For example, FIG. 20A depicts an exemplary system 2000 that includes a stand alone computer architecture where a processing system 2002 (e.g., one or more computer processors) includes a hierarchy manager 2004 being executed on it. The processing system 2002 has access to a computer-readable memory 2006 in addition to one or more data stores 2008. The one or more data stores 2008 may contain demand planning hierarchy structure data 2010 as well as product demand amounts 2012.

FIG. 20B depicts a system 2020 that includes a client server architecture. One or more user PCs 2022 accesses one or more servers 2024 running a hierarchy manager 826 on a processing system 2027 via one or more networks 2028. The one or more servers 2024 may access a computer readable memory 2030 as well as one or more data stores 2032. The one or more data stores 2032 may contain demand planning hierarchy structure data 2034 as well as product demand amounts 2036.

FIG. 20C shows a block diagram of exemplary hardware for a stand alone computer architecture 2050, such as the architecture depicted in FIG. 20A, that may be used to contain and/or implement the program instructions of system embodiments of the present invention. A bus 2052 may serve as the information highway interconnecting the other illustrated components of the hardware. A processing system 2054 labeled CPU (central processing unit) (e.g., one or more computer processors), may perform calculations and logic operations required to execute a program. A processor-readable storage medium, such as read only memory (ROM) 2056 and random access memory (RAM) 2058, may be in communication with the processing system 2054 and may contain one or more programming instructions for performing the method of implementing a hierarchy manager. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 2060 interfaces one or more optional disk drives to the system bus 2052. These disk drives may be external or internal floppy disk drives such as 2062, external or internal CD-ROM, CD-R, CD-RW or DVD drives such as 2064, or external or internal hard drives 2066. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2060, the ROM 2056 and/or the RAM 2058. Preferably, the processor 2054 may access each component as required.

A display interface 2068 may permit information from the bus 2056 to be displayed on a display 2070 in audio, graphic, or alphanumeric format. Communication with external devices may optionally occur using various communication ports 2072.

In addition to the standard computer-type components, the hardware may also include data input devices, such as a keyboard 2073, or other input device 2074, such as a microphone, remote control, pointer, mouse and/or joystick.

This written description uses examples to disclose the invention, including the best mode, and also to enable a person skilled in the art to make and use the invention. The patentable scope of the invention may include other examples. For example, in addition to demand planning hierarchies, the systems and methods described herein may be equally applicable to other hierarchical arrangements of data. As a further example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of delivering products, comprising:
   receiving demand planning data identifying product quantities for a plurality of hierarchically arranged nodes organized into parent-child relationships, wherein a particular node in the plurality of nodes includes a product quantity and a disaggregation factor, and wherein the disaggregation factor identifies how the product quantity at the particular node is divided among children nodes of the particular node;
   associating, using one or more data processors, a relieving flow and an augmenting flow with the particular node in the plurality of nodes, wherein a relieving flow is configured to subtract product quantity from one of the plurality of nodes, and wherein an augmenting flow is configured to add product quantity to one of the plurality of nodes;
   receiving a change to the product quantity or the disaggregation factor at the particular node;
   generating, using the one or more data processors, a set of simultaneous equations using the demand planning data, the relieving flows, the augmenting flows, and the change at the particular node, wherein one of the equations indicates that a sum of the product quantity and the augmenting flow at the particular node is equal to a sum of the product quantities of the children nodes and the relieving flow of the particular node; and
   optimally, using the one or more data processors, solving the set of simultaneous equations by minimizing a sum of the augmenting flows and the relieving flows associated with the plurality of nodes and determining revised product quantities at each of the plurality of nodes, wherein one or more products are delivered according to the revised product quantities.

2. The method of claim 1, further comprising:
   identifying an inconsistent lock condition at a node in the plurality of nodes that has an associated relieving flow or augmenting flow that is greater than zero after the set of simultaneous equations has been optimally solved.

3. The method of claim 2, further comprising:
   providing an alert that a feasible solution is not available; and
   identifying the node that has the inconsistent lock condition.

4. The method of claim 1, further comprising:
   receiving changes for multiple nodes prior to generating the set of simultaneous equations.

5. The method of claim 1, wherein the change at the particular node locks the product quantity or the disaggregation factor at the particular node.

6. The method of claim 1, wherein optimally solving uses a Primal Simplex Algorithm, a Dual Simplex Algorithm, or Network Optimization Algorithms.

7. The method of claim 1, further comprising:
   storing updated demand planning data based on the revised product quantities;
   receiving an additional change to the demand planning data;
   generating a new set of simultaneous equations based on the revised product quantities and the additional change; and
   solving the new set of simultaneous equations.

8. The method of claim 1, wherein the demand planning data tracks forecasted demand for a plurality of products including at least two of a stock keeping unit level, a brand level, and a product type level.

9. The method of claim 1, wherein one relieving flow and one augmenting flow are associated with each node in the plurality of nodes.

10. A computer-implemented system for delivering products, comprising:
one or more data processors;
one or more computer-readable storage mediums containing instructions configured to cause the one or more processors to perform operations including:
receiving demand planning data identifying product quantities for a plurality of hierarchically arranged nodes organized into parent-child relationships, wherein a particular node in the plurality of nodes includes a product quantity and a disaggregation factor, and wherein the disaggregation factor identifies how the product quantity at the particular node is divided among children nodes of the particular node;
associating a relieving flow and an augmenting flow with the particular node in the plurality of nodes, wherein a relieving flow is configured to subtract product quantity from one of the plurality of nodes, and wherein an augmenting flow is configured to add product quantity to one of the plurality of nodes;
receiving a change to the product quantity or the disaggregation factor at the particular node;
generating a set of simultaneous equations using the demand planning data, the relieving flows, the augmenting flows, and the change at the particular node, wherein one of the equations indicates that a sum of the product quantity and the augmenting flow at the particular node is equal to a sum of the product quantities of the children nodes and the relieving flow of the particular node; and
optimally solving the set of simultaneous equations by minimizing a sum of the augmenting flows and the relieving flows associated with the plurality of nodes and determining revised product quantities at each of the plurality of nodes, wherein one or more products are delivered according to the revised product quantities.

11. The system of claim 10, wherein changes are received for multiple nodes prior to generating the set of simultaneous equations.

12. The system of claim 10, wherein the change at the particular node locks the product quantity or disaggregation factor at the particular node for solving the set of simultaneous equations.

13. The system of claim 10, wherein optimally solving the set of simultaneous equations includes using a Primal Simplex Algorithm, a Dual Simplex Algorithm, or Network Optimization Algorithms.

14. The system of claim 10, wherein the demand planning data tracks forecasted demand for a plurality of products including at least two of a stock keeping unit level, a brand level, and a product type level.

15. The system of claim 10, wherein one relieving flow and one augmenting flow are associated with each node in the plurality of nodes.

16. A computer-program product for delivering products, tangibly embodied in a non-transitory machine-readable storage medium, including instructions configured to cause a data processing apparatus to:
receive demand planning data identifying product quantities for a plurality of hierarchically arranged nodes organized into parent-child relationships, wherein a particular node in the plurality of nodes includes a product quantity and a disaggregation factor, and wherein the disaggregation factor identifies how the product quantity at the particular node is divided among children nodes of the particular node;
associate a relieving flow and an augmenting flow with the particular node in the plurality of nodes, wherein a relieving flow is configured to subtract product quantity from one of the plurality of nodes, and wherein an augmenting flow is configured to add product quantity to one of the plurality of nodes;
receive a change to the product quantity or the disaggregation factor at the particular node;
generate a set of simultaneous equations using the demand planning data, the relieving flows, the augmenting flows, and the change at the particular node, wherein one of the equations indicates that a sum of the product quantity and the augmenting flow at the particular node is equal to a sum of the product quantities of the children nodes and the relieving flow of the particular node; and
optimally solve the set of simultaneous equations by minimizing a sum of the augmenting flows and the relieving flows associated with the plurality of nodes and determining revised product quantities at each of the plurality of nodes, wherein one or more products are delivered according to the revised product quantities.

17. The computer-program product of claim 16, wherein the instructions are further configured to cause a data processing apparatus to:
identify an inconsistent lock condition at a node in the plurality of nodes that has an associated relieving flow or augmenting flow that is greater than zero after the set of simultaneous equations has been optimally solved.

18. The computer-program product of claim 16, wherein the instructions are further configured to cause a data processing apparatus to:
provide an alert that a feasible solution is not available; and
identify the node that has the inconsistent lock condition.

19. The computer-program product of claim 16, wherein the instructions are further configured to cause a data processing apparatus to:
receive changes for multiple nodes prior to generating the set of simultaneous equations.

20. The computer-program product of claim 16, wherein the change at the particular node locks the product quantity or the disaggregation factor at the particular node.

21. The computer-program product of claim 16, wherein optimally solving uses a Primal Simplex Algorithm, a Dual Simplex Algorithm, or Network Optimization Algorithms.

22. The computer-program product of claim 16, wherein the instructions are further configured to cause a data processing apparatus to:
store updated demand planning data based on the revised product quantities;
receive an additional change to the demand planning data;
generate a new set of simultaneous equations based on the revised product quantities and the additional change; and
solve the new set of simultaneous equations.

23. The computer-program product of claim 16, wherein the demand planning data tracks forecasted demand for a plurality of products including at least two of a stock keeping unit level, a brand level, and a product type level.

24. The computer-program product of claim 16, wherein one relieving flow and one augmenting flow are associated with each node in the plurality of nodes.

* * * * *